United States Patent
Matsue et al.

(10) Patent No.: US 6,328,674 B1
(45) Date of Patent: Dec. 11, 2001

(54) METHOD OF CONTROLLING CLUTCH PRESSURE OF TRANSMISSION AND CONTROL APPARATUS THEREFOR

(75) Inventors: Akira Matsue, Komatsu; Makoto Toyama, Tatsunokuchi-machi, both of (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/527,515

(22) Filed: Mar. 16, 2000

(30) Foreign Application Priority Data

Mar. 17, 1999 (JP) .................................... 11-072496
Jan. 7, 2000 (JP) .................................... 12-001305

(51) Int. Cl.$^7$ .................................................. F16H 61/00
(52) U.S. Cl. ............................................. 477/155; 74/335
(58) Field of Search ..................... 74/335, 336 R; 477/143, 155; 192/87.13, 87.18; 475/120, 123, 127

(56) References Cited

U.S. PATENT DOCUMENTS

| | | | |
|---|---|---|---|
| 4,722,251 | * | 2/1988 | Sumiya et al. ............... 477/143 |
| 5,038,286 | * | 8/1991 | Asayama et al. ............. 477/143 X |
| 5,653,660 | * | 8/1997 | Tsukamoto et al. .......... 477/143 |
| 5,707,316 | * | 1/1998 | Tanahashi et al. ........... 477/116 |
| 5,890,575 | * | 4/1999 | Ohashi et al. ............... 192/87.13 |
| 5,902,344 | * | 5/1999 | Eike et al. .................. 701/67 |
| 6,088,645 | * | 7/2000 | Kawasaki et al. ............ 477/143 X |

FOREIGN PATENT DOCUMENTS

| 5-65731 | 9/1993 | (JP) . |
|---|---|---|
| WO98/01687 | 1/1998 | (WO) . |

* cited by examiner

*Primary Examiner*—Charles A Marmor
*Assistant Examiner*—Ankur Parekh
(74) *Attorney, Agent, or Firm*—Armstrong, Westerman, Hattori, McLeland, & Naughton, LLP

(57) ABSTRACT

A method of controlling a clutch pressure of a transmission which can be applied to a clutch of a large capacity piston volume, which has a short time lag for engaging the clutch, a uniform clutch engaging time and is inexpensive, and a control apparatus therefor. Accordingly, in a clutch pressure control apparatus of a transmission including a pressure control valve which supplies a discharge oil in a hydraulic pump to a clutch chamber at a time of engaging a clutch, whereby the clutch chamber is full of the discharge oil, gradually increases a hydraulic pressure in the clutch chamber after being filled so as to engage the clutch, and drains the oil in the clutch chamber to a tank at a time of disengaging the clutch, the apparatus is provided with a supply bypass valve which directly supplies the discharge oil of the hydraulic pump to the clutch chamber with bypassing the pressure control valve at a time of engaging the clutch, and a discharge bypass valve which directly drains the oil in the clutch chamber to the tank by bypassing the pressure control valve at a time of disengaging the clutch.

13 Claims, 9 Drawing Sheets

(a)   (b)   (c)

METHOD OF CONTROLLING CLUTCH PRESSURE OF TRANSMISSION AND CONTROL APPARATUS THEREFOR

BACKGROUND OF THE INVENTION

1. Field of the Invention

The present invention relates to a method of controlling a clutch pressure of a transmission structured so as to engage a hydraulic clutch so as to set a stage for shifting a speed, and a control apparatus therefor.

2. Description of the Related Art

The transmission generally has a main transmission which is provided with a clutch for a plurality of stages for shifting the speed including a backward movement, and a sub transmission which is provided with a clutch for a high speed and a low speed, and there has been known a structure which performs a speed change in forward and backward directions by a combination between the main transmission and the sub transmission and a structure which is provided with a clutch for a forward movement stage for shifting the speed and a clutch for a backward movement stage for shifting a speed.

In recent years, a large-size transmission has been developed together with an enlargement of a vehicle.

The applicant of the present application has filed Japanese Patent Publication No. 5-65731 and PCT International Publication No. WO98/01687 with respect to the following technique, as a clutch hydraulic pressure control apparatus in a transmission corresponding to an enlargement of the vehicle.

There has been disclosed a method which is provided with an electromagnetic proportional pressure control valve and a flow amount detecting valve for each of speed change clutches of a clutch hydraulic pressure control apparatus, the method detecting a filling state of a clutch operating fluid within a piston volume of the clutch by the flow amount detecting valve, operating the electromagnetic proportional pressure control valve in real time at the same time of being filled with fluid so as to perform a gradual increase of a fluid pressure, performing a clutch engagement control, and measuring a time for being filled with the fluid at the preceding clutch engagement so that a timing for the clutch engagement does not become different even when the time for filling a clutch chamber is changed due to an abrasion of a clutch disc, a dispersion of a part processing accuracy and a variation of an engine speed so as to automatically set to a suitable target filling time after comparing with the suitable target filling time.

However, because in the technique described in Japanese Patent Publication No. 5-65731 and PCT International Publication No. WO98/01687, the fluid is caused to flow into the clutch chamber through throttling passages of the electromagnetic proportional pressure control valve and the flow amount detecting valve, the filling time of the fluid into the clutch chamber is elongated and the clutch engagement is delayed when it is applied to a clutch of a large capacity piston volume in a large-size transmission, so that an engagement time lag is generated. In particular, in the case of a construction vehicle, it is necessary to frequently repeat a speed change between a forward movement first speed and a forward movement second speed for excavating earth and sand. Accordingly, it is necessary that an amount of fluid to be supplied to the clutch chamber is set to a large amount when starting the speed change and to a small amount immediately before the clutch is engaged, thereby performing a rapid speed change and a reduction of the speed change shock.

Further, because the operation is performed while frequently repeating an engagement and a disengagement of the clutch, the oil is again started to be supplied to the clutch before the discharge of the oil is competed in the case that a discharging time of the oil within the clutch chamber at the disengaging time is long, so that a dispersion is generated in the time for the clutch engagement in the same clutch, an there is a problem that a speed change shock is easily generated because a lot of oil is supplied to the clutch chamber in which the oil is still left.

It is possible to supply a lot of oil at a time of starting the speed change and make the discharging time of the soil short at a time of disengaging the clutch by enlarging a capacity of the electromagnetic proportional pressure control valve and the flow amount detecting valve. However, a large space is required and costs are high.

SUMMARY OF THE INVENTION

The present invention is was made by paying attention to the problems in the prior art mentioned above, and an object of the present invention is to provide a method of controlling a clutch pressure of a transmission which can be applied to a clutch of a large capacity piston volume, has a short time lag for engaging the clutch, has a uniform clutch engaging time and is an inexpensive, and a control apparatus therefor.

In order to achieve the object mentioned above, in accordance with a first aspect of the invention, there is provided a clutch pressure control apparatus of a transmission having a pressure control valve which supplies a discharge oil in a hydraulic pump to a clutch chamber at a time of engaging a clutch, whereby the clutch chamber is filled with the discharge oil, gradually increases a hydraulic pressure in the clutch chamber after being filled so as to engage the clutch, and drains the oil in the clutch chamber to a tank at a time of disengaging the clutch, wherein the apparatus comprises: a supply bypass valve which directly supplies the discharge oil of the hydraulic pump to the clutch chamber by bypassing the pressure control valve at a time of engaging the clutch.

In accordance with the first aspect of the invention, when the clutch is engaged, the pressure control valve is switched and a part of the pressure oil from the hydraulic pump is supplied to the clutch chamber via the pressure control valve. When the pressure control valve is switched, the supply bypass valve is also opened, and most of the other oil is directly supplied to the clutch chamber from the hydraulic pump by bypassing the pressure control valve. In the transmission having a clutch of a large capacity piston volume, the pressure control valve having a large flow amount is generally enlarged and requires a large space, however, in accordance with the present invention, it is possible to supply a large flow amount of oil by enlarging a capacity of the bypass valve while keeping the pressure control valve compact. Accordingly, even in the transmission having the clutch of a large capacity piston volume, it is possible to reduce the filling time of the oil to the clutch chamber, change speed for a short engaging time and reduce a size of the clutch pressure control apparatus.

In accordance with a second aspect of the invention, there is provided a clutch pressure control apparatus of a transmission having a pressure control valve which supplies a discharge oil in a hydraulic pump to a clutch chamber at a time of engaging a clutch, whereby the clutch chamber is filled with the discharge oil, gradually increases a hydraulic pressure in the clutch chamber after being filled so as to engage the clutch, and drains the oil in the clutch chamber to a tank at a time of disengaging the clutch, wherein the apparatus comprises: a supply bypass valve which directly supplies the discharge oil of the hydraulic pump to the clutch chamber by bypassing the pressure control valve at a time of engaging the clutch; and a discharge bypass valve which directly drains the oil in the clutch chamber to the tank by bypassing the pressure control valve at a time of disengaging the clutch.

In accordance with the second aspect of the invention, when releasing the engagement of the clutch, the oil in the clutch chamber is drained to the clutch chamber not only via the pressure control valve but also via the discharge bypass circuit which communicates the clutch chamber with the tank by opening the discharge bypass valve. Accordingly, in comparison with the case that where the discharge bypass valve is not provided, it is possible to shorten the discharge time of the oil in the clutch chamber. Three fore, even in the vehicle which has the clutch of a large capacity piston volume and frequently engages and disengages the clutch, it is possible to drain all the oil in the clutch chamber within a time after the clutch is disengaged and the next engagement is started, and a state of always supplying the same amount of oil is kept at a time of starting the engagement, so that a uniform clutch engaging time can be obtained.

In the transmission having a clutch of a large capacity piston volume, the pressure control valve having a large flow amount is generally enlarged and requires a large space, however, in accordance with the present invention, it is possible to supply a large flow amount of oil by enlarging a capacity of the bypass valve while keeping the pressure control valve compact. Accordingly, even in the transmission having the clutch of a large capacity piston volume, it is possible to reduce a size of the clutch pressure control apparatus.

In accordance with the third aspect of the invention, there is provided a clutch pressure control apparatus of a transmission comprising: a flow amount detecting valve which detects that a clutch chamber is full of an oil; a pressure control valve which supplies an oil to the clutch chamber at a time of engaging a clutch, whereby the clutch chamber is filled with the discharge oil, gradually increases a hydraulic pressure in the clutch chamber after the flow amount detecting valve detects that the clutch chamber is filled with the oil so as to engage the clutch, and drains the oil in the clutch chamber to a tank at a time of disengaging the clutch; and a supply bypass vale which directly supplies the oil to the clutch chamber from the hydraulic pump by bypassing the pressure control valve at a time of engaging the clutch.

In accordance with the third aspect of the invention, when the clutch is engaged, both of the pressure control valve and the supply bypass valve are opened so as to supply the oil to the clutch. At this time, a part of the oil is supplied to the clutch chamber via the pressure control valve and the flow amount detecting valve and most of the other oil is directly supplied to the clutch chamber from the hydraulic pump by bypassing the pressure control valve and the flow amount detecting valve. From the time when the flow amount detecting valve detects that the clutch chamber is full of the oil, the pressure control valve gradually increases the hydraulic pressure in the clutch chamber so as to engage the clutch. Accordingly, even in the transmission having the clutch of a large capacity piston volume, it is possible to reduce the filling time of the oil to the clutch chamber, and the clutch is engaged with no shock. Further, because the flow amount detecting valve, the pressure control valve and the supply bypass valve are integrally assembled, the clutch pressure control apparatus is made compact.

In accordance with a fourth aspect of the invention, there is provided a clutch pressure control apparatus of a transmission comprising: a flow amount detecting valve which detects that a clutch chamber is full of oil; a pressure control valve which supplies oil to the clutch chamber at a time of engaging a clutch, whereby the clutch chamber is full of the discharge oil, gradually increases a hydraulic pressure in the clutch chamber after the flow amount detecting valve detects that the clutch chamber is full of oil so as to engage the clutch, and drains the oil in the clutch chamber to a tank at a time of disengaging the clutch; a supply bypass valve which directly suppliers the oil to the clutch chamber from the hydraulic pump by bypassing the pressure control valve at a time of engaging the clutch; and a discharge bypass valve which directly drains the oil in the clutch chamber to the tank by bypassing the pressure control valve at a time of disengaging the clutch.

In accordance with the fourth aspect of the invention, in addition to the effect at a time of engaging the clutch in accordance with the third aspect of the invention, when the clutch is disengaged, the pressure control valve is switched so as to drain the oil in the clutch chamber to the tank and a part of the oil in the clutch chamber is drained to the tank via the pressure control valve and the flow amount detecting valve. Because the discharge bypass valve is opened as well as the pressure control valve is switched, most of the other oil in the clutch chamber is directly drained to the tank by bypassing the pressure control valve and the flow amount detecting valve. Accordingly, in comparison with the case in which the discharge bypass valve is not provided, it is possible to reduce the discharging time of the oil in the clutch chamber. Further, even in a vehicle which has the clutch of a large capacity piston volume and frequently engages and disengages the clutch, it is possible to drain all the oil in the clutch chamber within a time after the clutch is disengaged and the next engagement is started, and a state of always supplying the same amount of oil is kept at a time of starting the engagement, so that a uniform clutch engaging time can be obtained. Further, because the flow amount detecting valve, the pressure control valve, the supply bypass valve and the discharge bypass valve are integrally assembled, the clutch pressure control apparatus is made compact.

In accordance with a fifth aspect of the invention, there is provided a clutch pressure control apparatus based on the third aspect of the invention, wherein a clutch fluid supply valve block provided with clutch pressure controlling ports comprising an input port within which the pressure control valve and the flow amount detecting valve are arranged and which supplies pressure oil discharged from the hydraulic pump to the pressure control valve and the flow amount detecting valve, an output port which outputs the oil output from the flow amount detecting valve to the clutch chamber, a drain port which drains the oil in the clutch chamber to the tank, and a clutch fluid bypass valve block within which the supply bypass valve is arranged and in which said clutch pressure controlling ports are provided, are respectively provided as independent elements, and the clutch pressure controlling ports in the respective blocks are provided at a position where the clutch fluid supply valve block and the clutch fluid bypass valve block are aligned with each other when they are assembled and connected with each other.

In accordance with the fifth aspect of the invention, in the clutch fluid bypass valve block which installs the supply bypass valve, he input port, the output port and the drain port are respectively arranged at the positions corresponding to th port positions of the input port which is arranged in the clutch fluid supply valve block and supplies the pressure oil from the hydraulic pressure pump to the pressure control valve and the flow amount detecting valve, the output port which outputs the oil output from the flow amount detecting valve to he clutch chamber and the drain port which drains the oil in the clutch chamber to the tank. Accordingly, the clutch fluid bypass valve bock and the clutch fluid supply valve block, which are separately formed, can be easily assembled and integrated. Further, when the supply bypass valve is not required, it is easy to control only the pressure control valve and the flow amount detecting valve by taking out the clutch fluid bypass valve block from the clutch fluid supply valve block. Because the clutch fluid bypass valve block can be easily attached and detected and the parts can be commonly used, an inexpensive clutch pressure control apparatus for the transmission can be obtained.

In accordance with a sixth aspect of the invention, there is provided a clutch pressure control apparatus of a transmission on the basis of the fourth aspect of the invention, wherein a clutch fluid supply valve block provided with clutch pressure controlling ports comprising an input port within which the pressure control valve and the flow amount detecting valve are arranged and which supplies the pressure oil discharged from the hydraulic pump to the pressure control valve and the flow amount detecting valve, an output port which outputs the oil output from the flow amount detecting valve to the clutch chamber, a drain port which drains the oil in the clutch chamber to the tank, and a clutch fluid bypass valve block within which the supply bypass valve and the discharge bypass valve are arranged and in which said clutch pressure controlling ports are provided, are respectively provided as independent elements, and the clutch pressure controlling ports in the respective blocks are provided at a position where the clutch fluid supply valve block and the clutch fluid bypass valve block are aligned with each other when they are assembled and connected with each other.

In accordance with the sixth aspect of the invention, in the clutch fluid bypass valve block which installs the supply bypass valve and the discharge bypass valve, the input port, the output port and the drain port are respectively arranged at the positions corresponding to the port positions of the input port, which is arranged in the clutch fluid supply valve block and which supplies pressure oil from the hydraulic pressure pump to the pressure control valve and the flow amount detecting valve, the output port which outputs the oil output from the flow amount detecting valve to the clutch chamber and the drain port which drains the oil in the clutch chamber to the tank. Accordingly, the clutch fluid bypass valve block and the clutch fluid supply valve block, which are separately formed, can be easily assembled and integrated. Further, when the supply bypass valve and the discharge bypass valve are not required, it is easy to control only the pressure control valve and the flow amount detecting valve by taking out the clutch fluid bypass valve block from the clutch fluid supply valve block. Because the clutch fluid bypass valve block can be easily attached and detached and the parts can be commonly used, an inexpensive clutch pressure control apparatus for the transmission can be obtained.

In accordance with the seventh aspect of the invention, there is provided a clutch pressure control apparatus of a transmission on the basis of the first aspect of the invention or the second aspect of the invention, wherein the supply bypass valve has a pressure receiving chamber which receives a hydraulic pressure from the hydraulic pump, and the hydraulic pressure in the pressure receiving chamber is switched by an electromagnetic valve which is provided with a switching valve for switching between a position at which the oil from the hydraulic pressure pump is introduced into said pressure receiving chamber and a position at which the oil in said pressure receiving chamber is drained due to a spring force, thereby opening and closing the supply bypass circuit.

In accordance with the seventh aspect of the invention, since the position of the bypassing spool for controlling a large flow amount of the supply bypass valve is switched by a pilot hydraulic pressure which is turned on and off by the electromagnetic valve so as to open and close the supply bypass circuit, a total space of the electromagnetic valve and the bypassing spool becomes more compact than the electromagnetic valve which can singly open and close the supply bypass circuit, so that an inexpensive and easily maintainable clutch pressure control apparatus can be obtained.

In accordance with the eighth aspect of the invention, there is provided a clutch pressure control apparatus of a transmission on the basis of the second aspect of the invention, wherein the discharge bypass valve has a pressure receiving chamber which receives a hydraulic pressure from the hydraulic pump and the hydraulic pressure in the pressure receiving chamber is switched by an electromagnetic valve which is provided with a switching valve for switching between a position at which the oil from the hydraulic pressure pump is introduced into the pressure receiving chamber and a position at which the oil in the pressure receiving chamber is drained due to a spring force, thereby opening and closing the discharge bypass circuit.

In accordance with the eighth aspect of the invention, because the position of the bypassing spool for controlling a large flow amount of the discharge bypass valve is switched by a pilot hydraulic pressure which is turned on and off by the electromagnetic valve so as to open and close the discharge bypass circuit, a total space of the electromagnetic valve and the bypassing spool becomes more compact than the electromagnetic valve which can singly open and close the discharge bypass circuit, so that an inexpensive and easily maintainable clutch pressure control apparatus can be obtained.

In accordance with a ninth aspect of the invention, there is provided a clutch pressure control apparatus of a transmission on the basis of the first aspect of the invention or the second aspect of the invention, further comprising a controller which outputs a command signal for opening the supply bypass valve for a first predetermined time from a time of instructing a start of the clutch engagement to the supply bypass valve and a command signal for opening the pressure control valve for a second predetermined time from a time of instructing a start of the clutch engagement to the pressure control valve, respectively, the controller controlling so that the first predetermined time is shorter than the second predetermined time.

In accordance with the ninth aspect of the invention, at a time of engaging the clutch, at first, both of the pressure control valve and the supply bypass valve are opened, and a large flow amount of oil is supplied to the clutch chamber. Only the supply bypass vale is closed after the first predetermined time has passed, and before the second predetermined time has passed, a predetermined middle flow amount or small flow amount of oil is supplied to the clutch chamber from the pressure control valve till the filling is completed. Because the first predetermined time for which the supply bypass valve is opened is shorter than the second predetermined time, the oil is always supplied near the filling at a large flow amount, and thereafter, the oil is accurately supplied to the pressure control valve until the filling is completed. Accordingly, there can be obtained a method of controlling a clutch pressure of a transmission in which no shock is generated when the filling is completed and a filling time is stable so as to provide an excellent speed change operation feeling.

In accordance with a tenth aspect of the invention, there is provided a clutch pressure control apparatus of a transmission on the basis of the second aspect of the invention, further comprising a controller which outputs a command signal for directly discharging the oil in the clutch chamber to the tank to the discharge bypass valve for a predetermined time at a time of disengaging the clutch.

In accordance with the tenth aspect of the invention, when the pressure control valve is switched so that the oil in the clutch chamber is drained, the discharge bypass valve is opened so as to directly drain a part of the oil in the clutch chamber to the tank. The structure is made such that the predetermined time for opening is, for example, set to three seconds, whereby the oil in the clutch chamber is all drained within the time. Accordingly, even in a vehicle which has the clutch of a large capacity piston volume and frequently engages and disengages the clutch, it is possible to drain all the oil in the clutch chamber within a time after the clutch is disengaged and the next engagement is started, and a state of always supplying the same amount of oil is kept at a time of starting the engagement, so that a uniform clutch engaging time can be obtained.

In accordance with an eleventh aspect of the invention, there is provided a method of controlling a clutch pressure of a transmission structured so as to supply an oil to a clutch chamber via a pressure control valve and directly supply the oil to the clutch chamber from a hydraulic pump by bypassing the pressure control valve by a supply bypass valve, at a time of engaging a clutch, comprising the steps of: opening both of the pressure control valve and the supply bypass valve at a time of engaging the clutch; closing only the supply bypass valve after a first predetermined time has passed from a time of instructing a start of an engagement; making an opening degree of the pressure control valve smaller than an opening degree at a time of instructing the start of the engagement after a second predetermined time which is greater than the first predetermined time has passed from the time of instructing the start of the engagement; and thereafter, supplying the oil to the clutch chamber till the clutch chamber is full of the oil.

In accordance with the eleventh aspect of the invention, because both of the pressure control valve and the supply bypass valve are at first opened only for the first predetermined time from the time of instructing the start of the engagement, a total large flow amount of oil constituted by the oil supplied from the pressure control valve and the oil supplied from the supply bypass valve is supplied to the clutch chamber. Because the supply bypass valve is closed after the first predetermined time has passed and before the second predetermined time has passed and only the pressure control valve keeps the opening degree at the time of instructing the start of the engagement, a middle flow amount of oil supplied only from the pressure control valve is supplied to the clutch chamber. Next, after the start of the engagement is instructed and before the filling is completed after the second predetermined time, the opening degree of the pressure control valve is made smaller than the opening degree at the time of instructing the start of the engagement so as to supply a small flow amount of oil to the clutch chamber. Accordingly, because the filling of the oil in the clutch chamber is substantially completed when the supply of the large and middle flow amount is completed, it is possible to shorten a time for engaging the clutch. Further, because the flow amount is gradually reduced step-by-step in accordance with the order of the large, middle and small flow amounts, there can be obtained the method of controlling the clutch of the transmission in which no shock is generated when the filling is completed and a filling time is stable so as to obtain a good speed change feeling.

In accordance with a twelfth aspect of the invention, there is provided a method of controlling a clutch pressure of a transmission structured so as to supply an oil to a clutch chamber via a pressure control valve and directly supply the oil to the clutch chamber from a hydraulic pump by bypassing the pressure control valve by a supply bypass valve, at a time of engaging a clutch, comprising the steps of: opening both of the pressure control valve and the supply bypass valve at a time of engaging the clutch; closing only the supply bypass valve after a first predetermined time has passed from a time of instructing a start of an engagement; and thereafter, supplying the oil to the clutch chamber only by the pressure control valve until the clutch chamber is full of the oil.

In accordance with the twelfth aspect of the invention, because both of the pressure control valve and the supply bypass valve are at first opened only for the first predetermined time from the time of instructing the start of the engagement, a total large flow amount of oil constituted by the oil supplied from the pressure control valve and the oil supplied from the supply bypass valve is supplied to the clutch chamber. Only the pressure control valve is controlled after the first predetermined time has passed and before the filling is completed, thereby supplying a predetermined flow amount of oil which is smaller than the large flow amount to the clutch chamber. Accordingly, because the filling of the oil in the clutch chamber is substantially completed when the supply of the large flow amount is completed, it is possible to shorten a time for engaging the clutch. Further, because the filling can be gradually achieved by controlling at the predetermined flow amount after the large flow amount, there can be obtained the method of controlling the clutch of the transmission in which no shock is generated when the filling is completed and a filling time is stable so as to obtain a good speed change feeling.

In accordance with a thirteenth aspect of the invention, there is provided a method of controlling a clutch pressure of a transmission, further comprising: calculating a filling target time before the clutch chamber is full of oil and an opening time from a time of instructing the start of the engagement of the pressure control valve in accordance with the filling target time, on the basis of an engine speed and an oil temperature; comparing an actual filling time at a time of operating the engagement of said clutch in accordance with the calculated opening time with said calculated filling target time; correcting the opening time to a time a predetermined time shorter than said calculated time when the filling actual time is shorter than the filling target time, and correcting the opening time to a time a predetermined time longer than said calculated time when the filling actual time is longer than the filling target time, thereby storing the opening time in correspondence to the conditions of the same engine speed and oil temperature; and controlling an opening of the pressure control valve under the same condition thereafter on the basis of the stored opening time so that the filling actual time is within the filling target time.

In accordance with th thirteenth embodiment, the filling target time is previously set in accordance with the engine speed and the oil temperature, the filling target time calculated on the basis of the engine speed and the oil temperature in real control time is compared with the filling actual time, and the opening time of the pressure control valve is corrected at every speed changes so that the filling actual time comes near the filling target time. Accordingly, even when the engine speed, the oil temperature, a leaking amount of the oil from the clutch chamber and the like are changed with the passage of time, it is possible to always maintain the filling target time, so that it is possible to obtain the method of controlling the clutch pressure of the transmission with an excellent speed change operation feeling.

In accordance with a fourteenth aspect of the invention, there is provided a method of controlling a clutch pressure of a transmission on the basis of the twelfth aspect of the invention, further comprising: calculating a target filling time before the clutch chamber is full of the oil and an opening time from a time of instructing the start of the engagement of the supply bypass valve in accordance with the target filling time, on the basis of an engine speed and an oil temperature; comparing a an actual filling time at a time of operating the engagement of the clutch in accordance with the calculated opening time with the calculated target filling time; correcting the opening time to a time a predetermined time shorter than the calculated time when the actual filling time is shorter than the target filling time, and correcting the opening time to a time a predetermined time longer than the calculated time when the actual filling time is longer than the target filling time, thereby storing the opening time in correspondence to the conditions of the same engine speed and oil temperature; and controlling an opening of the supply bypass valve under the same condition thereafter on the basis of the stored opening time so that the actual time is within the target filling time.

In accordance with the fourteenth embodiment, the filling target time is previously set in accordance with the engine speed and the oil temperature, the target filling time calculated on the basis of the engine speed and the oil temperature at a real control time is compared with the actual filling time, and the opening time of the supply bypass valve is corrected at every speed change so that the actual filling time approaches the target filling target. Accordingly, even when the engine speed, the oil temperature, a leaking amount of the oil from the clutch chamber and the like are changed with the passage of time, it is possible to always maintain the target filling time, so that it is possible to obtain the method of controlling the clutch pressure of the transmission with an excellent speed change operation feeling.

DETAILED DESCRIPTION OF PREFERRED EMBODIMENTS

A description will be given below of embodiments of a clutch pressure control method and a control apparatus therefor in accordance with the present invention with reference to the accompanying drawings. At first, a first embodiment will be described with reference to FIGS. 1 to 7.

Figure 1:
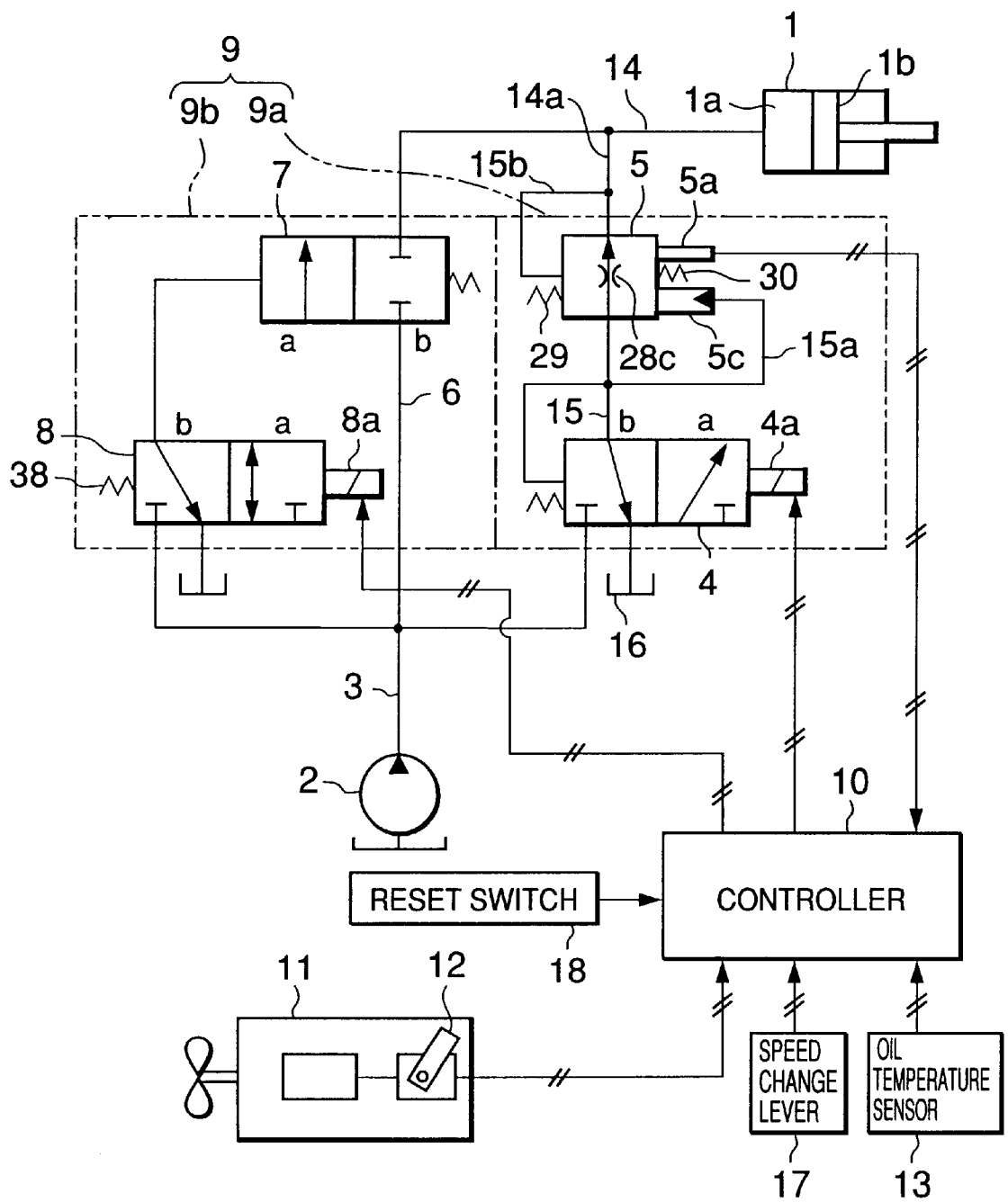
FIG. 1 is a view which shows a clutch hydraulic pressure control circuit of a first embodiment.
Figure 2:
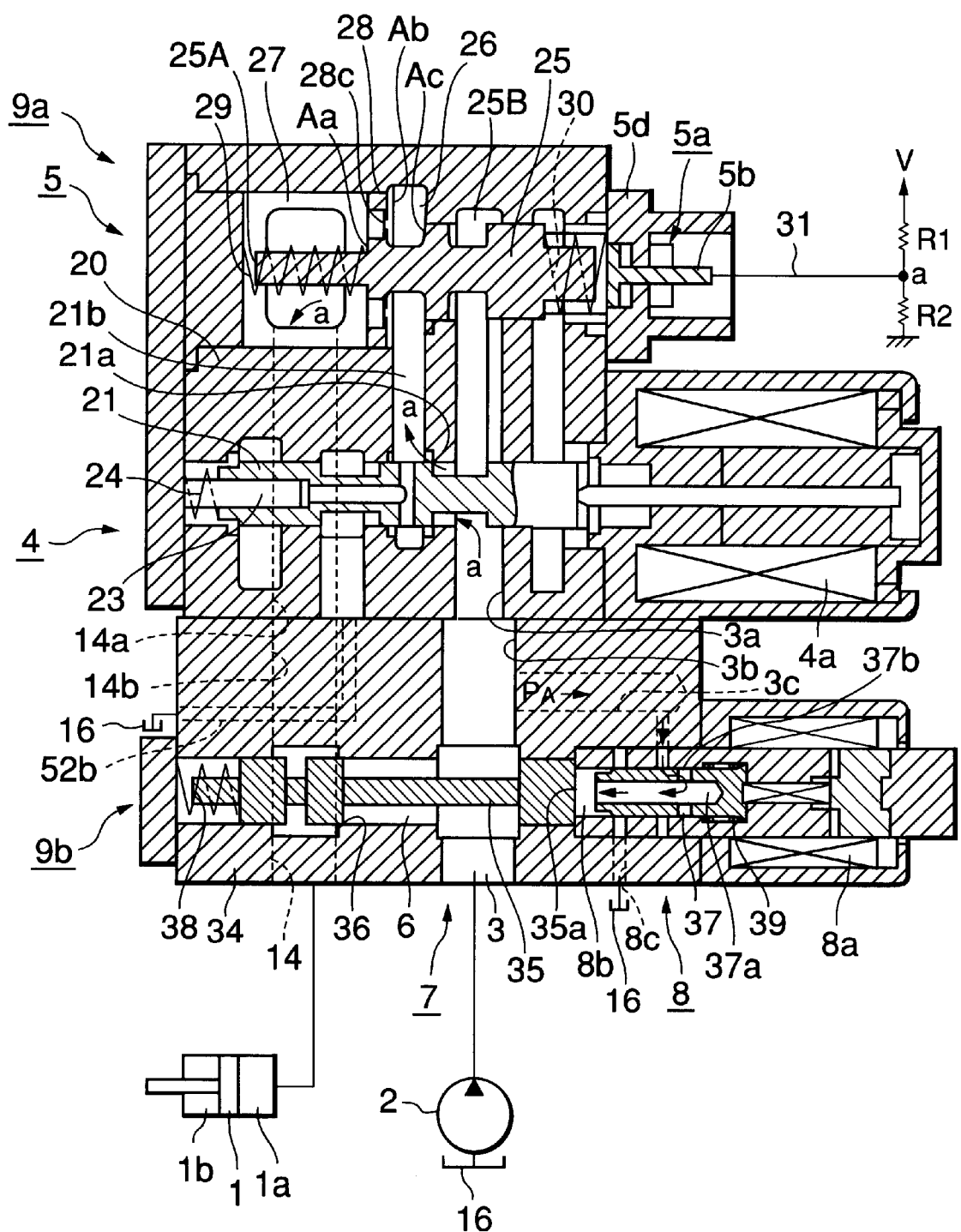
FIG. 2 is a cross-sectional view which shows details of the clutch hydraulic pressure control valve of the first embodiment.

FIG. 1 shows a structure of a hydraulic pressure circuit of a clutch pressure control valve block 9 of a transmission, and FIG. 2 shows a internal cross sectional structure of the clutch pressure control valve block 9.

In FIGS. 1 and 2, the clutch pressure control valve block 9 is provided in each of a plurality of clutches 1 of the transmission, and controls an inflow of a pressure oil into a clutch chamber 1a of each of the clutches 1. The clutch pressure control valve block 9 is constituted by a clutch fluid supply valve block 9a and a clutch fluid bypass valve block 9b. Further, the clutch fluid supply valve block 9a is constituted by an electromagnetic proportional pressure control valve 4 (hereinafter, refer to a pressure control valve 4) which controls a clutch hydraulic pressure, a flow amount detecting valve 5 which detects a flow amount flowing into the clutch chamber 1a and a sensor 5a corresponding to an embodiment of detecting means which detects a working oil filling state (that is, a completion of filling) in the clutch chamber 1a. Further, the clutch fluid bypass valve block 9b has a supply bypass valve 7 and a supply electromagnetic valve 8 which are mentioned below. Because a detailed structure of the clutch pressure control valve block 9 will be in detail described below with reference to FIG. 2, here, a structure of the hydraulic pressure circuit will be described in summary.

Each of the clutches 1 is constituted by a clutch chamber 1a which receives a clutch hydraulic pressure, and a piston 1b which slidably moves. The structure is made such that when a pressure in the clutch chamber 1a reaches a predetermined set pressure by being pressed by means of the piston 1b, a multiple disc clutch (not shown) is engaged, thereby transmitting a power of an engine 11 to a wheel (a drive wheel) from a transmission (not shown) via a reduction gear.

The pressure control valve 4 controls an amount and a pressure of a working oil which flows into the clutch chamber 1a of the clutch 1. Further, the flow amount detecting valve 5 detects a flow amount of the working oil which flows into the clutch chamber 1a so as to detect a filling state.

A discharge pipe passage 3 which feeds a discharge oil from the hydraulic pump 2 (which is called as a hydraulic pressure pump oil passage 3 within a clutch pressure control valve block 9) is connected to the clutch chamber 1*a* via the pressure control valve 4, an oil passage 15, the flow amount detecting valve 5, an output port 14*a* and a clutch oil passage 14. An oil passage 15*a* which is branched from the oil passage 15 is connected to an operating portion in a side of an end of the flow amount detecting valve 5, and an oil passage 15*b* which is branched from an output port 14*a* in a side of a downstream side of an installed orifice 28*c* is connected to the other end side. The structure is made such that a spool of the flow amount detecting valve 5 is operated so as to move from a neutral position in a operating direction when a differential pressure between a pressure in an upstream side and a pressure in a downstream side is generated, is returned to the neutral position due to an urging force of a spring when the differential pressure is lost, and is moved further so as to operate the sensor 5*a,* thereby detecting a completion of filling.

On the contrary, the discharge pipe 3 of the hydraulic pump 2 is connected to the clutch chamber 1*a* via the bypass oil passage 6 and the supply bypass valve 7 serving as a bypass circuit with respect to the pressure control valve 4 and the flow amount detecting valve 5. Further, the discharge pipe passage 3 of the hydraulic pump 2 is connected to an opposite end side to a spring side of the supply bypass valve 7 via the supply electromagnetic valve 8. The supply electromagnetic valve 8 is opened and closed by a command signal which is input to a supply solenoid 8*a* so as to apply a hydraulic pressure discharged from the hydraulic pump 2 to the supply bypass valve 7, thereby controlling an opening and closing position of the valve 7.

The solenoid 4*a* of the pressure control valve 4 and the supply solenoid 8*a* of the supply electromagnetic valve 8 are connected to a controller 10 so as to input a command signal from the controller 10. Further, a filling state detecting signal of the sensor 5*a* is input to the controller 10.

The controller 10 is mainly constituted by a computer apparatus such as a microcomputer or the like, performs a predetermined calculating process mentioned below on the basis of the filling state detecting signal input from each of the sensors 5*a* corresponding to the respective clutches 1, an engine speed, an oil temperature of the transmission and a stage for shifting the speed so as to calculate each of the command signals, and outputs each of the command signals to the solenoid 4*a* of each of the pressure control valves 4 and the supply solenoid of each of the supply electromagnetic valves 8.

Figure 3:
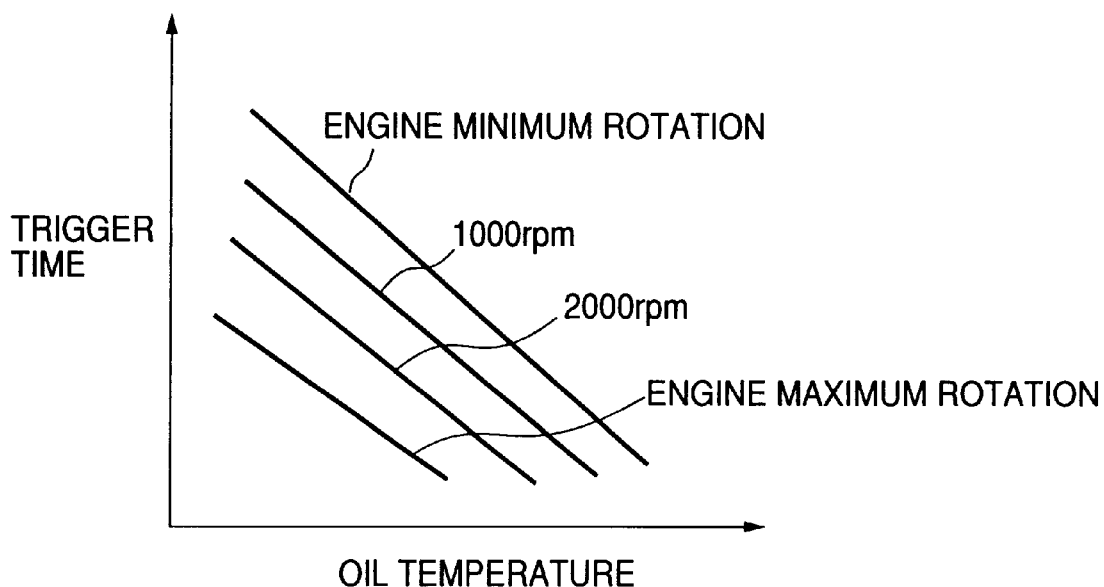
FIG. 3 is a graph which shows a relation between a set trigger time and an oil temperature of a transmission by using an engine speed as a parameter.
Figure 4:
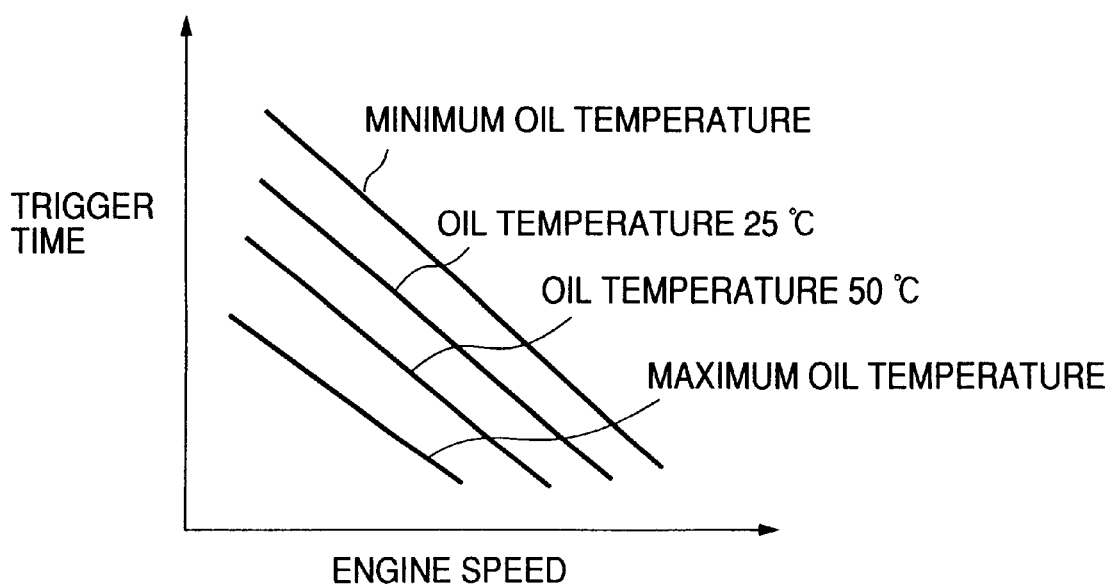
FIG. 4 is a graph which shows a relation between a set trigger time and an engine speed by using an oil temperature of a transmission as a parameter.

In the controller 10, a function map which expresses a relation among an output time of the command signal (hereinafter, refer to as a trigger time) output to the solenoid 4*a* of the pressure control valve 4, the engine speed and the oil temperature of the transmission as shown in FIGS. 3 and 4 is stored at each of the stages for shifting the speed of the transmission. The function map may be, for examples, as shown in FIG. 3, set to a predetermined data map which expresses a relation between the oil temperature and the trigger time by setting the engine speed to a parameter, or as shown in FIG. 4, set to a predetermined data map which expresses a relation between the engine speed and the trigger time by setting the oil temperature to a parameter.

The function map in FIGS. 3 and 4 shows a case that the stage for shifting the speed is, for example, in a first stage of a forward movement, and the same function map is stored in the controller 10 with respect to the other stages for shifting the speed.

The controller 10 inputs a rotational angle signal of a throttle lever 12 in the engine 11, a speed change signal from a speed change lever 17 which selects a forward or backward movement and a stage for shifting the speed of a transmission (not shown), an oil temperature signal from an oil temperature sensor 13 in the transmission, and a filling state detecting signal from the sensor 5*a*. The controller 10 calculates the engine speed on the basis of the rotational angle signal of the throttle lever 12. In this case, with respect to the engine speed, the structure may be made such that the number of rotations of the engine output shaft is detected by the rotary sensor so as to be input. Then, the controller 10 is structured so as to calculate the target trigger time corresponding to the current speed state, engine speed and oil temperature on the basis of the function map previously stored as mentioned above, and to output predetermined pressure control valve trigger signals Ia2 and Ia3 to the solenoid 4*a* of the pressure control valve 4 as shown in (B) of FIG. 5 mentioned below during the calculated target trigger time. Further, the structure is made such as to output a predetermined opening command signal (a bypass valve trigger signal Ia1 previously set as shown in (A) of FIG. 5 to the supply solenoid 8*a* of the supply electromagnetic valve 8 during a predetermined time ta1 which is previously set. The, the controller 10 measures an actual time desired for filling so that the filling is finished within a previously set target filling time between a time of starting a supply of the working oil into the clutch chamber 1*a* and a time when the clutch chamber 1*a* is full of the working oil after performing the process mentioned above, corrects the target trigger time which outputs the pressure control valve trigger signal Ia2 to the solenoid 4*a* of the pressure control valve 4 on the basis of a result of comparison between the actually measured filling time and the target filling time, and feeds the corrected data back to the function map so as to store them.

Next, a description will be given of a particular structure of the clutch pressure control valve block 9 shown in FIG. 1 with reference to FIG. 2.

The present clutch pressure control valve block 9 is structured such as to add on the clutch fluid bypass valve block 9*b* to the clutch fluid supply valve block 9*a*. When it does not add on the clutch fluid bypass valve block 9*b,* it flows in the pressure oil from the hydraulic pressure pump 2 via the input port 3*a* formed in the clutch fluid supply valve block 9*a* and supplies the pressure oil to the clutch 1 via the output port 14*a*.

The pressure control valve 4 arranged within the first valve body 20 of the clutch fluid supply valve block 9*a* has a spool 21 for a control valve, a load piston 23, first spring 24 and a solenoid 4*a*. A right end of the control valve spool 21 which communicates the input port 3*a* from the hydraulic pump 2 with the clutch chamber 1*a* is brought into contact with the solenoid 4*a,* and the first spring 24 is provided at a left end. The control valve spool 21 is urged in a direction that the opening portion 21*a* is opened by the solenoid 4*a,* and is pressed and returned in a direction that the opening portion 21*a* is closed by the load piston 23. A total amount of the returning force by the working oil pressure acting on the load piston 23 and the spring force of the first spring is balanced with an electromagnetic force of the solenoid 4*a,* whereby an opening amount of the opening portion 21*a* of the control valve spool 21 is determined. That is, the working oil pressure within the clutch chamber 1*a* is controlled by the electromagnetic force of the solenoid 4*a*. In the present embodiment, in order to switch an amount of oil supplied to the clutch chamber 1*a* between a middle flow amount and a small flow amount in two stages as mentioned below with reference to FIG. 5, an opening amount of the opening portion 21*a* of the control valve spool 21 is controlled in two stages by changing the electromagnetic force of the solenoid 4a in two stages.

The flow amount detecting valve 5 arranged within the clutch fluid supply valve block 9a is provided with a spool 25 for the flow amount detecting valve (hereinafter, refer to as a detecting valve spool 25), a second spring 29 and a third spring 30. These projecting portions are formed in the detecting valve spool 25, and a first oil chamber 25B, a second oil chamber 26 and a third oil chamber 27 are defined by the projecting portions. An orifice 28c is provided in the projecting portions of the detecting valve spool 25 and between the second oil chamber 26 and the third oil chamber 27. The detecting valve spool 25 has three different pressure receiving areas Aa, Ab and Ac, and a relation of Aa+Ac>Ab and Ab>Ac is established among the areas. The second spring 29 and the third spring 30 are respectively brought into contact with and inserted into a left end portion and a right end portion of the detecting valve spool 25. The detecting valve spool 25 keeps a neutral position at a position of a free length in each of the second spring 29 and the third spring 30 when no pressure is generated in the second oil chamber 26 and the third oil chamber 27. At this time, a communication between the first oil chamber 25B and the second oil chamber 26 is shut. Further, when a differential pressure is generated between the second oil chamber 26 and the third oil chamber 27, the detecting valve spool 25 moves leftward at a predetermined distance due to a differential pressure between the second oil chamber 26 and the third oil chamber 27, however, the structure is made such that the left end surface 25A of the detecting valve spool 25 is brought into contact with the end surface of the first valve body 20, whereby the first oil chamber 25B and the second oil chamber 26 are not communicated with each other. In the structure mentioned above, the second spring 29 and the third spring 30 serve as a returning spring for the detecting valve spool 25, and the structure is made such that when the pressure oil is not supplied, the detecting valve spool 25 comes to the neutral position.

The detecting portion 5b of the sensor 5a is provided in a right side of an upper portion of the first valve body 20, and the detecting portion 5b is made of a metal and is structured such as to detect that he detecting valve spool 25 moves further rightward from the neutral position shown in FIG. 2 against the spring force of the third spring 30. The detections portion 5b is mounted to the first valve body 20 by an installing cover 5d, and a lead wire 31 which is drawn out to an external portion is connected to the detecting portion 5b. The lead wire 31 is connected to a point between a resistance R1 and a resistance R2, which are connected in series.

A predetermined direct current voltage V (for example, 12 V) is applied between the resistances R1 and R2, and the first valve body 20 is grounded. As mentioned above, the sensor 5a for detecting the clutch chamber filling state and for detecting the clutch pressure is constituted by a third spring 30, a detecting portion 5b which is brought into contact with the detecting valve spool 25 and serves as a contact point, the resistances R1 and R2 and the like. The clutch fluid supply valve block 9a provided with the sensor 5a is independently provided in the clutch of each of the stages for shifting the speed.

An electric potential at the a point between the resistances R1 and R2 is input to the controller 10 as the detecting signal of the sensor 5a.

Next, a description will be given of a case of adding on the clutch fluid bypass valve block 9b which installs the supply bypass valve 7 and the supply electromagnetic valve 8 to the clutch fluid supply valve block 9a. The hydraulic pump port 3b and the clutch port 14b which are formed in the clutch fluid supply valve block 9a and positioned and connected so as to be aligned with the input port 3a of the pressure oil from the hydraulic pump 2 and the output port 14a to the clutch 1, are formed in the clutch fluid bypass valve block 9b.

A second valve body 34 of the clutch fluid bypass valve block 9b has a supply bypass spool 35 of the supply bypass valve 7, and the hydraulic pressure pump oil passage 3 which inputs the oil from the hydraulic pump 2, the bypass oil passage 6 which is connected to the hydraulic pump oil passage 3 and the clutch oil passage 14 which outputs the oil to the clutch chamber 1a are formed within the second valve body 34. The supply bypass spool 35 is structured such as to open (at an opening position) or shut (at a closing position) between the bypass oil passage 6 and the clutch oil passage 14 connected to the hydraulic pump oil passage 3.

A fourth spring 38 is provided in such a manner as to be brought into contact with a left end in the drawing of the supply bypass spool 35, and the fourth spring 38 serves as a return spring of the supply bypass spool 35. Further, a supply free piston 37 which is interposed within the oil chamber 8b is provided in a right portion in the drawing go the supply bypass spool 35, and the supply free piston 37 is structured such as to move leftward when the command signal having a predetermined electric current valve is output to the supply solenoid 8a. Further, a fifth spring 39 is provided on an outer peripheral surface of a right end portion of the supply free piston 37, and the supply free piston 37 is urged rightward by the fifth spring 39. The supply free piston 37 has a supply opening portion 37a which is open to a side of the supply bypass spool 35 in an axial direction of an inner portion thereof, and has a supply communicating hole 37b which communicates an outer peripheral surface with the supply opening hole 37a at a n axial predetermined position. The structure is made such that when the supply free piston 37 moves leftward by the supply solenoid 8a, the pilot oil passage 3c which is branched from the hydraulic pump oil passage 3 is communicated with the oil chamber 8b via the supply communicating hole 37b and the supply opening hole 37a of the supply free piston 37, so that eh oil supplied from the pilot oil passage 3c and having a pilot pressure P is flowed as shown by an arrow so as to act on the supply pressure receiving portion 35a of gate supply bypass spool 35, thereby pressing the supply bypass spool 35 leftward. The structure is made such that eh bypass oil passage 6 and the clutch oil passage 14 are accordingly communicated with each other by the supply opening portion 36. Further, wen the operating command of the supply solenoid 8a is turned off, the supply free piston 37 moves rightward due to the urging force of the fifth spring 39, the oil supplied from the pilot oil passage 3c and having he pilot pressure P is not flowed thereinto, and the oil chamber 8b is communicated with the drain port 8c, so that the oil pressure within the oil chamber 8b becomes 0. Accordingly, because the supply bypass spool 35 moves rightward due to the urging force of the fourth spring 38, the supply opening portion 36 is closed and the bypass oil passage 6 and the clutch oil passage 14 are closed.

As shown in FIG. 2, the clutch fluid supply valve block 9a has the input port 3a and the output port 14a and is structured so as to add on the clutch fluid bypass valve block 9b having he hydraulic pump port 3b and the clutch port 14b which can be respectively aligned with an positioned at the input port 3a and the output port 14a to the clutch fluid supply valve block 9a. The clutch fluid bypass valve block 9b is constituted by the supply bypass spool 35 of the supply bypass valve 7 which operates the clutch oil passage 14 connected to the clutch chamber 1a to an opening position or a closing position, the fourth spring 38 for returning to a neutral position which is arranged at one end of the supply bypass spool 35, the supply free piston 37 which is arranged at another end of the supply bypass spool 35 and arranged in the oil chamber 8b connected to the pilot oil passage 3c branched from the hydraulic pump oil passage 3, a fifth spring 39 which is provided on an outer peripheral surface of a right end portion of the supply free piston 37 and urges the supply free piston 37 in a direction of returning to the neutral position, the supply solenoid 8a which operates the supply free piston 37 to a position of operating the pilot pressure P from the pilot oil passage 3c, and the drain port 8c which drains the oil in the coil chamber 8b when the command of the supply solenoid 8a is turned off.

A description will be given of an operation of the structure shown in FIGS. 1 and 2 with reference to a time chart shown in FIG. 5.

Figure 5:
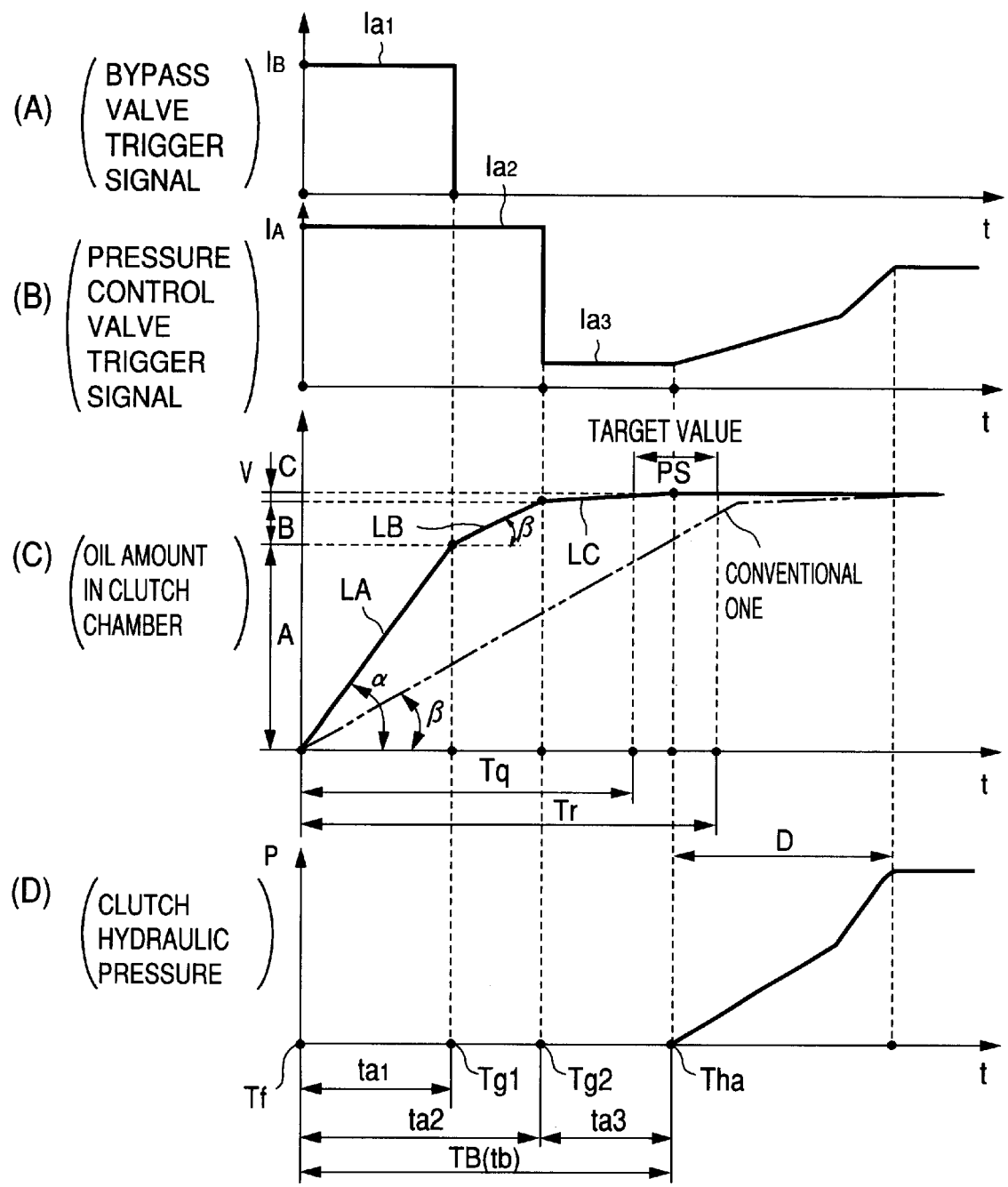
FIG. 5 is a time chart which explains a relation among a supply bypass valve trigger signal, a pressure control valve trigger signal, a clutch chamber oil amount and a clutch hydraulic pressure at a time of learning a trigger time ta2.

In FIG. 5, reference symbol (A) denotes a trigger signal IB transmitted from the controller 10 to the supply solenoid 8a of the supply electromagnetic valve 8 which operates the supply bypass valve 7 (called as a bypass valve trigger signal), reference symbol (B) denotes a trigger signal IA transmitted from the controller 10 to the solenoid 4a of the pressure control valve 4 (called as a pressure control valve trigger signal), reference symbol (C) denotes an oil amount V supplied to the clutch chamber 1a, reference symbol (D) denotes a clutch hydraulic pressure P, and respective horizontal axes show a passing time from the start of supplying the pressure oil. Further, reference symbol Tf shown in a horizontal axis of FIG. 5 denotes a trigger start time of each of the trigger signals, and reference symbol Tg1 denotes an output finish time of the bypass valve trigger signal IB. Further, reference symbol Tg2 denotes an output finish time of a predetermined middle flow amount output signal Ia2 of the pressure control valve trigger signal IA, and reference symbol Tha denotes an output finish time of a predetermined small flow amount output signal Ia3 (that is, a working oil filling time).

At a time of starting the speed change, the controller 10 reads the trigger times ta1 and ta2 in correspondence to the current stage for shifting the speed, the oil temperature an the engine speed from the function map, outputs the bypass valve trigger signal IB (the illustrated trigger signal Ia1) to th supply solenoid 8a of the supply electromagnetic valve 8 during the trigger time ta1 mentioned above, and at the same time, outputs the pressure control valve trigger signal IA (the illustrated middle flow amount output signal Ia2) to the solenoid 4a of the pressure control valve 4 during the trigger time ta2. In this case, the trigger time ta1 and the trigger time ta2 are respectively called as a "first predetermined time" and a "second predetermined time".

During the trigger time ta1 for which the supply bypass valve 7 an the pressure control valve 4 are simultaneously opened, the oil supplied from the hydraulic pump 2 flows into the second oil chamber 26 of the flow amount detecting valve 5 (shown by an arrow a in FIG. 2) after a flow amount corresponding to a magnitude of the middle flow amount output signal Ia2 flows into the oil passage 21b from the hydraulic pump oil passage 3 via the opening portion 21a of the pressure control valve 4, and the oil further flows into the oil passage 21b from the hydraulic pump oil passage 3 via the opening portion 21a of the pressure control valve 4, and the oil further flows into the third oil chamber 27 via the orifice 28c. Then, the oil which flows into the clutch oil passage 14 from the third oil chamber 27 and the oil obtained by the at the oil supplied from the hydraulic pump 2 flows into the clutch oil passage 14 from the supply opening portion 36 of the supply bypass valve 7 via the bypass oil passage 6 from the hydraulic pump oil passage 3, are combined with each other and flow into the clutch chamber 1a. At this time, an oil amount V which flows into the clutch chamber 1a is expressed by a line LA (an incline α) in (C) of FIG. 5. As shown in (C) of FIG. 5, which expressing an oil amount V which is supplied to the clutch chamber at a time of starting the speed change in the conventional transmission by a two-dot chain line (an incline β), the structure is made such that the oil amount V supplies a large flow amount as shown by a line LA (an incline α) by simultaneously opening the supply bypass valve 7 and the pressure control valve 4 with respect to the supply oil amount to this conventional clutch chamber. When the trigger time ta1 has passed, the controller 10 decides when the oil amount of the clutch chamber 1a reaches a predetermined amount near the filling, and stops the output of the trigger signal Ia1 to the supply solenoid 8a of the supply electromagnetic valve 8. Accordingly, because the supply free piston 37 of the supply bypass valve 7 moves rightward, eh supply bypass spool 35 moves rightward and the supply opening portion 36 of the supply bypass valve 7 is closed.

Thereafter, the controller 10 continues the output of the middle flow amount output signal Ia2 to the solenoid 4a till the trigger time ta2 has passed, in order to open only the pressure control valve 4. Accordingly, the oil from the hydraulic pump 2 flows into the clutch chamber 1a via the second oil chamber 26 of the flow amount detecting valve 5, the orifice 28c, the third oil chamber 27 and the clutch oil passage 14 after the flow amount corresponding to the magnitude of the middle flow amount output signal Ia2 flows into the oil passage 21b via the opening portion 21a of the pressure control valve 4 from the hydraulic pump oil passage 3. Accordingly, the oil amount V supplied to the clutch chamber 1a becomes a middle flow amount as expressed by a line LB (an incline β). After the trigger time ta2 has passed in the middle flow amount output signal Ia2, the controller 10 outputs the small flow amount output signal Ia3 to the solenoid 4a of the pressure control valve 4 for the time ta3, and controls the opening amount of the opening portion 21a in the pressure control valve 4 in correspondence to the magnitude of the small flow amount output signal Ia3. Accordingly, the oil amount V to the clutch chamber 1a is supplied at a small flow amount as expressed by a line LC, and the clutch chamber 1a becomes in a filling state after a predetermined time (the illustrated time ta3). At this time, the filling state detecting signal is output from the sensor 5a. Further, after a working oil filling time Tha at which the filling state detecting signal is input, during a time D shown in (D) of FIG. 5, it controls so that the opening amount of the opening portion 21a in the pressure control valve 4 gradually increases so as to gradually increase the clutch oil pressure P to a predetermined pressure.

Next, a description will be given of a filling detection (the completion of the filling) of the clutch chamber 1a by the flow amount detecting valve 5 and the sensor 5a and an operation of detecting whether or not the clutch is engaged with reference to FIGS. 2 and 5.

When the detecting valve spool 25 is at the neutral position and during a period of the fluid in-flow at which the detecting valve spool 25 moves leftward from the neutral position, the detecting valve spool 25 is apart from the detecting portion 5b. Accordingly, in this state, the electric potential of the a point of the sensor 5a is a value of the electric voltage obtained by dividing the voltage V by the resistances R1 and R2.

Thereafter, when the clutch chamber 1a is full of the oil, the filling is completed, the oil stops flowing and the differential pressure in the orifice 28c between the second oil chamber 26 and the third oil chamber 27 disappears. Accordingly, the detecting valve spool 25 moves rightward and is returned to the neutral position. Further, the detecting valve spool 25 moves rightward due to the reaction "Aa+ Ac>Ab" between the pressure receiving areas of the detecting valve spool 25, and the force obtained by adding a returning force of the second spring 29. Then, the detecting valve spool 25 moves further rightward with passing the neutral position, whereby the detecting spool 25 is brought into contact with the detecting portion 5b of the senor 5a. As a result, because the detecting portion 5b is conducted with the grounded first valve body 20 via the detecting valve spool 25, the a point electric potential is down to 0, an no electric potential appears at the a point. The controller 10 detects the descent of the electric potential and judges that he clutch chamber 1a is full of the oil and the filling is finished.

When judging that the completion of the filling is judged, the controller 10 immediately increases the command electric current of the pressure control valve 4 with respect to the clutch 1 from the initial pressure command electric current step by step. In this case, the controller 10 reduces the command electric current with respect to a forward stage clutch (not shown) to 0 at a time of judging the completion of the filling.

As mentioned above, when the filling of the working oil (that is, the completion of the filling) to the clutch chamber 1a is detected, the controller 10 stores this time as the working oil filling time Tha. A time period between the trigger signal start time Tf and the working oil filling time Tha expresses a time desired for filling (hereinafter, refer to as a filling actual time tb), and the controller 10 calculates the filling actual time tb at each of the clutches 1. Further, in the controller 10, the filling target time (also called as the target filling time) TB in correspondence to the stage for shifting the speed, the oil temperature and the engine speed, that is, data concerning an upper limit Tr and a lower limit Tq of an allowable range of the filling actual time tb are previously set and stored. Then, the controller 10 renews the trigger time ta2 of the function map which is used at the speed change control operation of this time by a calculation shown in FIG. 6 so that the filling actual time tb becomes within a range between the lower limit Tq and the upper limit Tr, and changes the function map in accordance with the renewed trigger time ta2 data. At a next speed change control time, the renewed data is read.

Next, a description will be given of a clutch hydraulic pressure control method in accordance with the present embodiment with reference to FIGS. 1 to 5 and on the basis of a control flow chart shown in FIG. 6.

At first, in a step 1, an operator inputs an angle of rotation of the throttle lever 12 operated by an acceleration pedal or the like so as to determine the engine speed, inputs an oil temperature signal (an oil temperature signal of a torque converter when commonly using the oil in the torque converter) from the oil temperature sensor 13 of the transmission, and inputs a signal of a position of the stage for shifting the speed of the transmission from the speed change lever 17.

Next, in a step 2, a lower limit Tq and an upper limit Tr of an optimum target filling time TB (refer to FIG. 5) corresponding to the current position of the stage for shifting the speed, the engine speed and the oil temperature of the transmission are read from the function map which is previously stored and corresponds to each of the stages for shifting the speed, the engine speed and the oil temperature of the transmission.

Then, in a step 3, the trigger signals ta1 and ta2 corresponding to the current position of the stage for shifting the speed, the engine speed and the oil temperature of the transmission are read from the function map.

Thereafter, in a step 4, the controller 10 starts outputting the predetermined trigger signal Ia1 (the bypass valve trigger signal IB) shown in (A) of FIG. 5 to the supply solenoid 8a which controls the supply bypass valve 7, with respect to each of the clutches 1 selected by the speed change lever 17, and simultaneously starts outputting the trigger signal Ia2 (the pressure control valve trigger signal IA) to the solenoid 4a which controls the pressure control valve 4. At the same time, it stores the trigger start time Tf. Otherwise, it may start measuring the passing time after the trigger start time Tf.

Next, in a step 5, it controls the supply bypass valve 7 and the pressure control valve 4 in accordance with the trigger signal Ia1 (the bypass valve trigger signal IB), the middle flow amount output signal Ia2 and the small flow amount output signal Ia3 (the pressure control valve trigger signal IA) shown in (A) and (B) of FIG. 5, and supplies the working oil from the hydraulic pump 2 to the clutch chamber 1a. In this case, as shown in (A) of FIG. 5, the controller 10 outputs the predetermined trigger signal Ia1 to the supply solenoid 8a of the supply electromagnetic valve 8 which operates the supply bypass valve 7, only for the trigger time ta1, and outputs the middle flow amount output signal Ia2 to the solenoid 4a of the pressure control valve 4 only for the trigger time ta2. Accordingly, the working oil is combined from the supply bypass valve 7 and the pressure control valve 4 and is supplied to the clutch chamber 1a at the maximum flow amount (shown by a modulation line LA) during the trigger time ta1 between the trigger start time Tf and the time Tg1.

Next, the trigger time ta1 shown in (A) of FIG. 5 has elapsed, the controller 10 stops outputting the trigger signal Ia1 to the supply solenoid 8a which controls the supply bypass valve 7 so as to shut the working oil which flows into the clutch chamber 1a from the supply bypass valve 7, however, thereafter, continuously outputs the middle flow amount output signal 1a2 to the solenoid 4a of the pressure control valve 4 till the time Tg2 (between the start time and the trigger time ta2). Accordingly, it supplies the working oil to the clutch chamber 1a from the pressure control valve 4 at a middle flow amount (shown by a line LB).

Next, as shown in (A) of FIG. 5, when the trigger time ta2 has passed, the controller 10 outputs to the solenoid 4a of the pressure control valve 4 the small flow amount output signal Ia3 which is smaller than the middle flow amount output signal Ia2. Accordingly, the working oil is supplied to the clutch chamber 1a from the pressure control valve 4 which is switched to the small flow amount at a small flow amount (shown by a line LC), and the clutch chamber 1a is gradually full in this state. In the small flow amount output signal Ia3 at this time, the trigger time is not set, and the trigger signal Ia3 is held till the clutch chamber 1a is full of the working oil. Thereafter, the a point electric potential of the sensor 5a descends to a 0 level when the filling is completed, and the controller 10 detects the descent to the 0 level and judges the filling of the working oil. In (C) of FIG. 5, a PS point expresses the time of bing full of the working oil, and expresses that the desired time at this time is within a predetermined range of the target filling time TB. The controller 10 requires the time Tha when the filling is completed. Otherwise, it may read a measured value of the passing time from the trigger start time Tf of outputting the command in the step 5. When the controller 10 inputs the working oil filling signal of the clutch chamber 1a, the controller 10 outputs to the solenoid 4a of the pressure control valve 4 the signal by which the clutch working hydraulic pressure gradually increases, and engages the clutch while generating no shock.

In a step 6, the controller 10 calculates the filling actual time tb on the basis of the filling finish time Tha read in the step 5 and the trigger start time Tf in the step 4.

In a step 7, it is judged whether or not the calculated actual filling time tb is within a range between the lower limit Tq an the upper limit Tr of the target filling time TB which is read in the step 2. That is, it judges whether or not the actual filling time tb satisfies the reaction "(minimum target value Tq)≦(filling actual time tb)≦(maximum target value Tr)". In the case in which the actual filling time tb is within the range between the lower limit tq and the upper limit Tr, the step goes to the step 1 and the processes mentioned above are repeated. Accordingly, the controller 10 outputs the trigger signal Ial to the supply solenoid 8a of the supply electromagnetic valve 8 only for the same trigger time tal also in the next speed change control process, an outputs the trigger signal Ia2 to the solenoid 4a of the pressure control valve 4 only for the same trigger time ta2.

In the step 7, in the case in which the actual filling time tb is larger than the upper limit Tr, the step goes to the step 10. In the step 10, in the case that the actual filling time tb is continuously larger than the upper limit tr at a plurality of turns, the trigger time ta2 is renewed in a step 8. In the step 8, the controller 10 adds a predetermined trigger time Δta to the trigger time ta2 of the pressure control valve 4 in the step 4 so as to calculate a new trigger time ta2, and renews the data of the function map in accordance with the calculated trigger time ta2. Thereafter, the step goes to the step 1 and the processes mentioned above are repeated.

In the step 7, in the case that the actual filling time tb is smaller than the lower limit tq, the step goes to the step 10. In the step 10, in the same manner as the case that the filling time tb is larger than the upper limit Tr, in the case that the actual filling time tb is continuously smaller than the lower limit Tq at a plurality of turns, the trigger time ta2 is renewed in a step 9. In the step 9, the controller 10 subtracts the predetermined trigger time Δta from the trigger time ta2 of the pressure control valve 4 in the step 4 so as to calculate a new trigger time ta2, and renews the data of the function map in accordance with the calculated trigger time ta2. Thereafter, the step goes to the step 1 and the precesses mentioned above are repeated.

In the description mentioned above, the structure is made such as to learn the trigger time ta2 for making the filling actual time equal to the target time, however, the structure may be made such that the trigger time ta2 is set to a predetermined fixed time and the trigger time tal is leaned.

Figure 7:
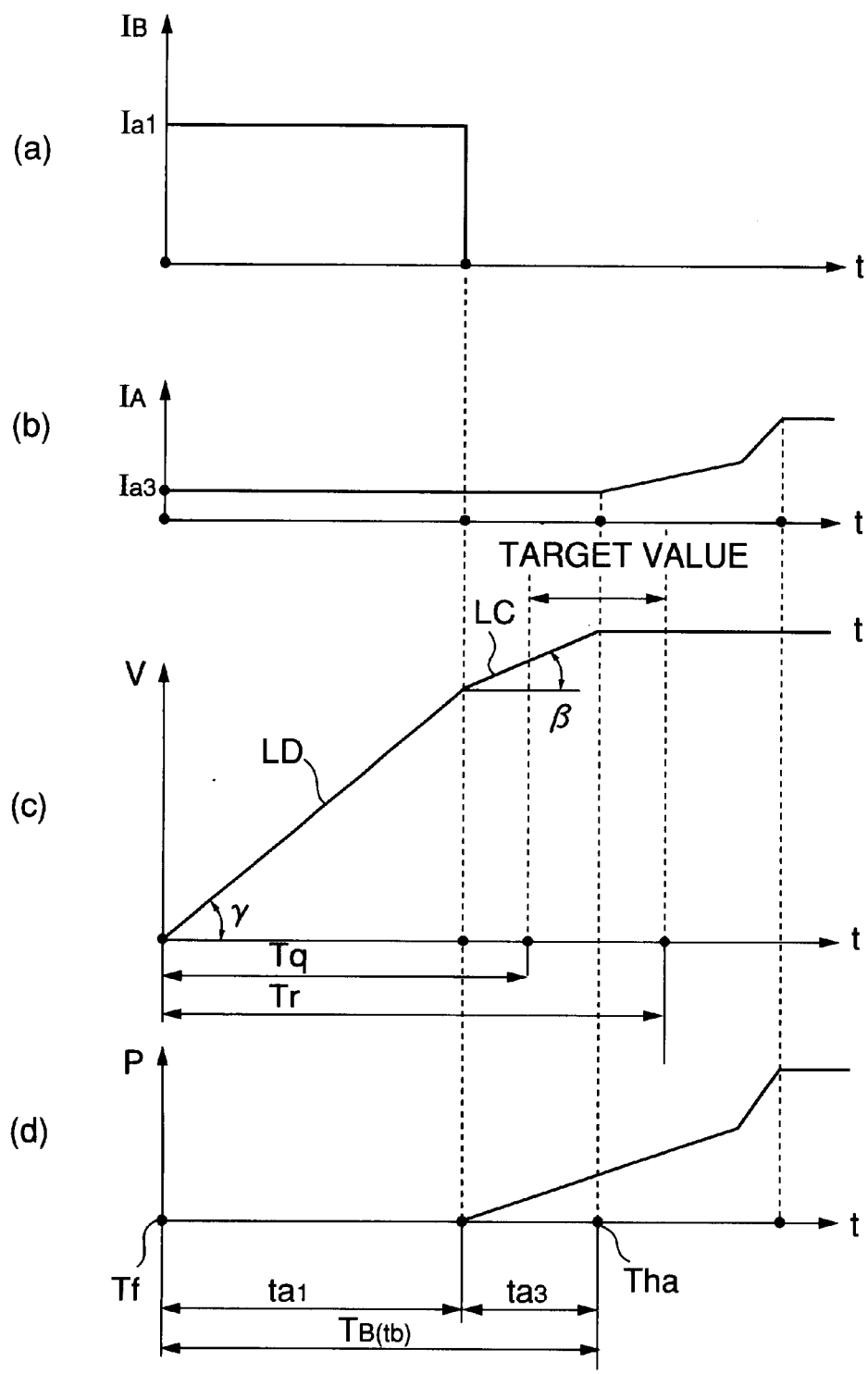
FIG. 7 is a time chart which explains a relation among a supply bypass valve trigger signal, a pressure control valve trigger signal, a clutch chamber oil amount and a clutch hydraulic pressure at qa time of learning a trigger time ta1.

A description will be given of a learning of the trigger time tal corresponding to another embodiment of a learning method with reference to FIG. 7. when learning the trigger time tal, the pressure control valve 4 outputs a trigger signal having a predetermined magnitude. In FIG. 7, a horizontal axis shows a time t, and vertical axes in (a), (b), (c) and (d) of FIG. 7 respectively show a bypass valve trigger signal IB, a pressure control valve trigger signal Ia, a clutch chamber oil amount V and a clutch oil pressure P. In the present embodiment, the trigger time tal o the supply bypass valve trigger signal Ia1 having a predetermined magnitude shown in (a) of FIG. 7 is learned. Then, as shown in (b) of FIG. 7, the pressure control valve trigger signal Ia3 keeps a predetermined magnitude. At this time, as shown in (c) of FIG. 7, the clutch chamber oil amount V increases in accordance with a time incline γ shown by a straight line LD till the tal after the speed change is started, and thereafter, increases in accordance with a time incline γ shown by a straight line LD till the tal after the speed change is tarted, and thereafter, increases in accordance with a time include β shown by a straight line LC till the filling is completed, that is, the tb has passed after the speed change is started. From the filling completing time Tha shown in (d) of FIG. 7, the pressure control valve trigger signal IA gradually increases and the clutch is engaged.

In a method of learning the trigger time tal, because a flow amount at the large flow amount is small but the supply flow amount from the pressure control valve is hardly generated in comparison with the method of learning the trigger time ta2, there is hardly generated a flow force which acts on the pressure control valve. Accordingly, there is an advantage in that the solenoid 4a of the pressure control valve 4 can be made in a small capacity and a compact size.

In FIG. 7, the same meaning as the meaning explained in FIG. 5 is shown by using the reference symbols used in FIG. 5. Further, the learning step of the trigger time ta2 explained in FIG. 5 is explained in FIG. 6, however, because the learning step of the trigger time tal explained in FIG. 7 can be explained by the steps obtained by changing the trigger time ta2 of the steps S8 and S9 in FIG. 6 to the trigger time tal in the same manner, the description thereof will be omitted.

Next, an operation and an effect of the first embodiment will be described.

The structure is made so as to combine the oil which flows from the pressure control valve 4 to the clutch chamber 1a via the flow amount detecting valve 5 and the oil which flows from the supply bypass valve 7 to the clutch chamber 1a by adding on the clutch fluid bypass valve block 9b to the clutch fluid supply valve block 9a, thereby supplying a large flow amount of oil to the clutch chamber 1a.

Then, at a time of starting the speed change, the supply bypass valve 7 and the pressure control valve 4 are simultaneously opened so as to supply the large flow amount to the clutch chamber 1a, and after the supply bypass valve 7 is closed after the predetermined time, only the pressure control valve 4 is continuously opened so as to supply the predetermined flow amount to the clutch chamber 1a till the clutch chamber 1a is full. Then, the structure is made such that the pressure of the working oil in the clutch chamber 1a is controlled to be gradually increased after the filling.

Accordingly, it is possible to smoothly press the multiple disc clutch (not shown) by the piston 1b at a time of engaging the clutch 1 so as to smoothly travel the vehicle with generating no shock. Further, because the structure is made such that a large flow amount of working oil is supplied to the clutch chamber 1a having a large capacity piston volume at a time of starting eh speed change so as to reduce the filling time, it is possible to set the engaging time of the multiple disc clutch within the predetermined target time. Accordingly, a sense that the engagement of the clutch of the transmission is late is not given an the speed change operation is improved.

Here, a description will be given of an operation and an effect by the learning of the trigger time ta2 which is explained with reference to FIGS. 5 and 6.

The filling actual time tb is controlled to always satisfy the relation "(lower limit tq)<(filling actual time tb)<(upper limit Tr)", and in accordance with the description mentioned above, the clutch is smoothly engaged while generating no shock or no sound, thereby smoothly propelling the vehicle. Further, because the lower limit Tq and the upper limit Tr of the optimum target filling time TB are set in correspondence to the stage for shifting the speed, the engine speed and the oil temperature of the transmission at each of the clutches, it is possible to engage for a short time with respect to the dispersion of the characteristics and the different used condition at each of the clutches. Further, in correspondence to with the change of the clutch piston volume due to the disc abrasion in the clutch, it is possible to always perform the filling within the target time and it is possible to always obtain a fixed completion time of clutch engagement. Further, because the working oil is initially supplied at the maximum flow amount even in the large capacity of clutch so as to reduce the time for filling, it is possible to set the engaging time of the clutch within the predetermined target time. Accordingly, a feeling that the engagement of the clutch is late is not provided to the operator and the operation is improved.

Figure 6:
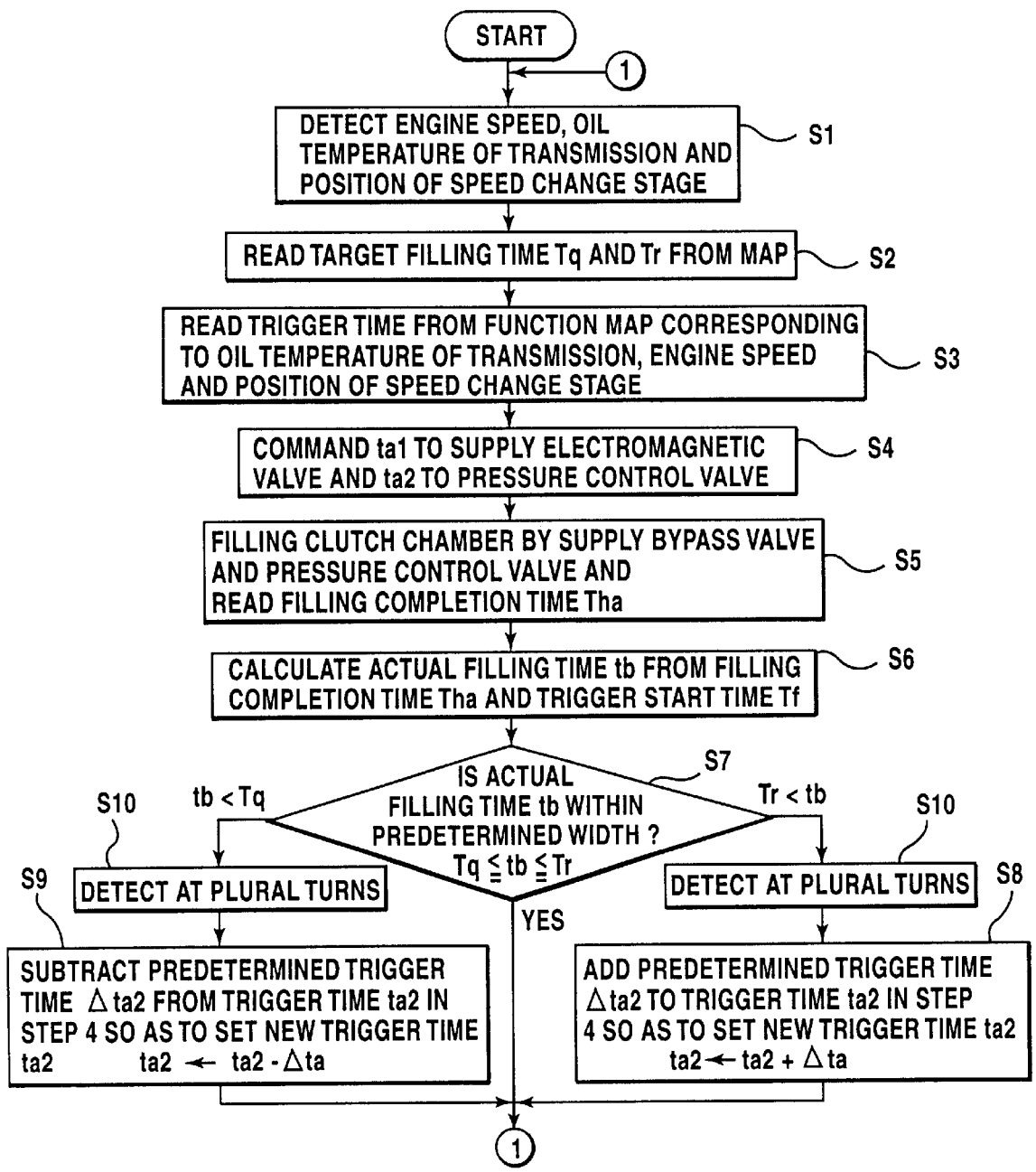
FIG. 6 is a flow chart at a time of learning the trigger time ta2.

In this case, in a step S10 of a flow chart in FIG. 6, it is judged whether or not the filling actual time tb is continuously within the range between the lower limit Tq an the upper limit Tr at a plurality of turns, thereby renewing the trigger time ta2. Accordingly, the trigger time ta2 is not frequently renewed and the control is stabilized, so that it is possible to obtain the clutch pressure control method and the control apparatus therefore without the engaging time being dispersed.

In this case, in the present embodiment, in the case of learning the trigger time ta2, the function map of each of the trigger time ta1 and the trigger time ta2 in correspondence to the stage for shifting the speed, the oil temperature and the engine speed is employed, however, the function map of the total time obtained by setting the relation "trigger time ta1+trigger time ta2" may be employed.

Further, the initial values of the trigger times ta1 and ta2 which respectively output the trigger signal Ia1 and the middle flow amount output signal Ia2 may be set with taking into consideration the dispersion of the capacity of the clutch chamber 1a at a time of manufacturing the element, after the vehicle is assembled. For example, the dispersion of the capacity is calculated by accumulating errors of the parts measured at each of the clutches, thereby setting so that the filling actual time tb is within the width between the lower limit Tq and the upper limit Tr of the target filling time TB at the minimum capacity. Further, after the vehicle is used for a predetermined operating time or more, or when the vehicle is used and the clutch disc is abraded, the initial value mentioned above may be set by storing the initial values of the trigger times ta1 and ta2 at the preceding set time and adding a predetermined trigger time Δta thereto.

Further, the trigger times ta1 and ta2 which output the trigger signals Ia1 and Ia2 may be changed by the operation that the operator operates a reset switch 18 as shown in FIG. 1 when a predetermined time has passed or when the operator feels the engagement of the clutch is late, thereby being reset to the previously stored initial values.

Figure 8:
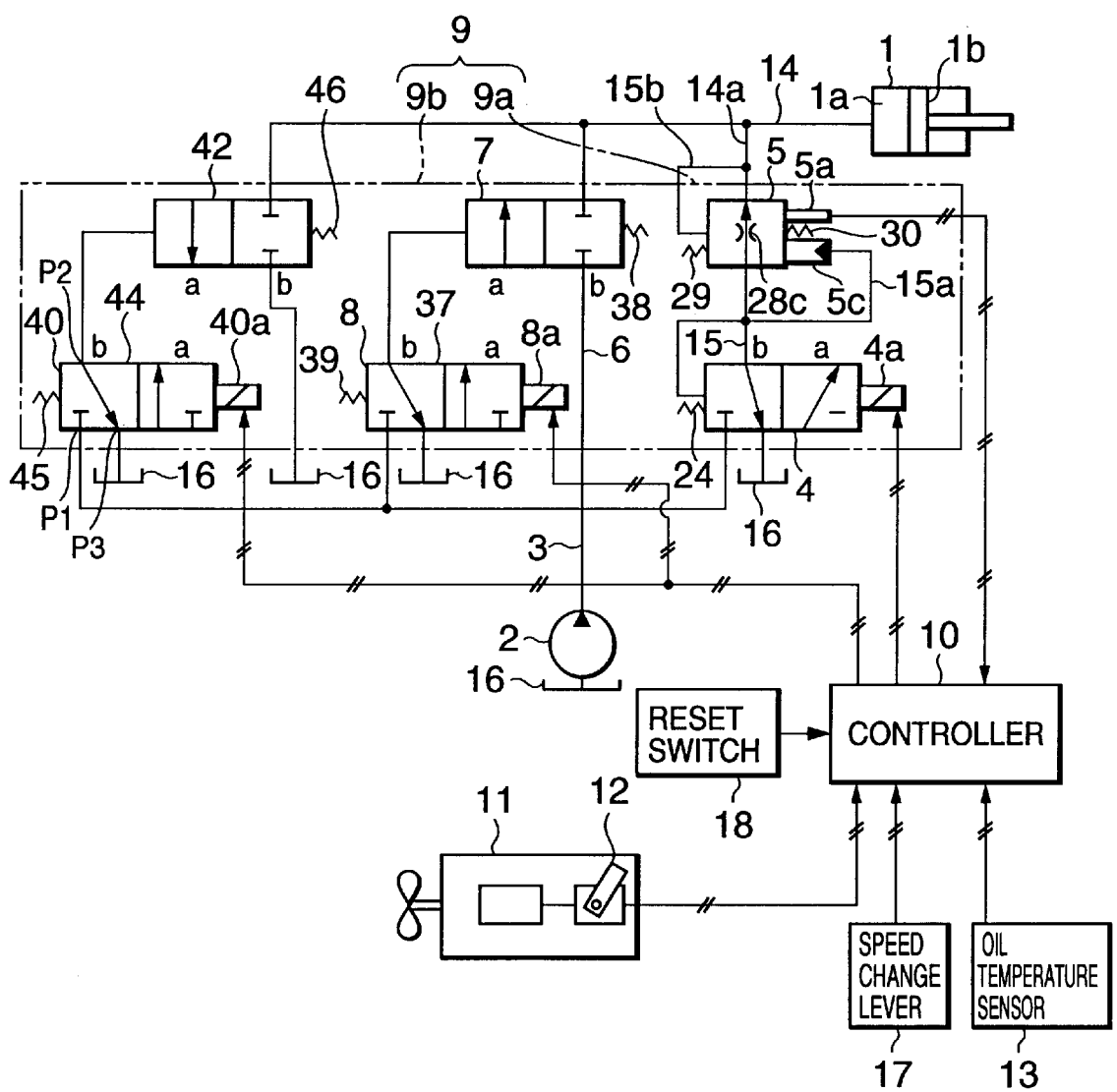
FIG. 8 is a view which shows a clutch hydraulic pressure control circuit of a second embodiment.
Figure 9:
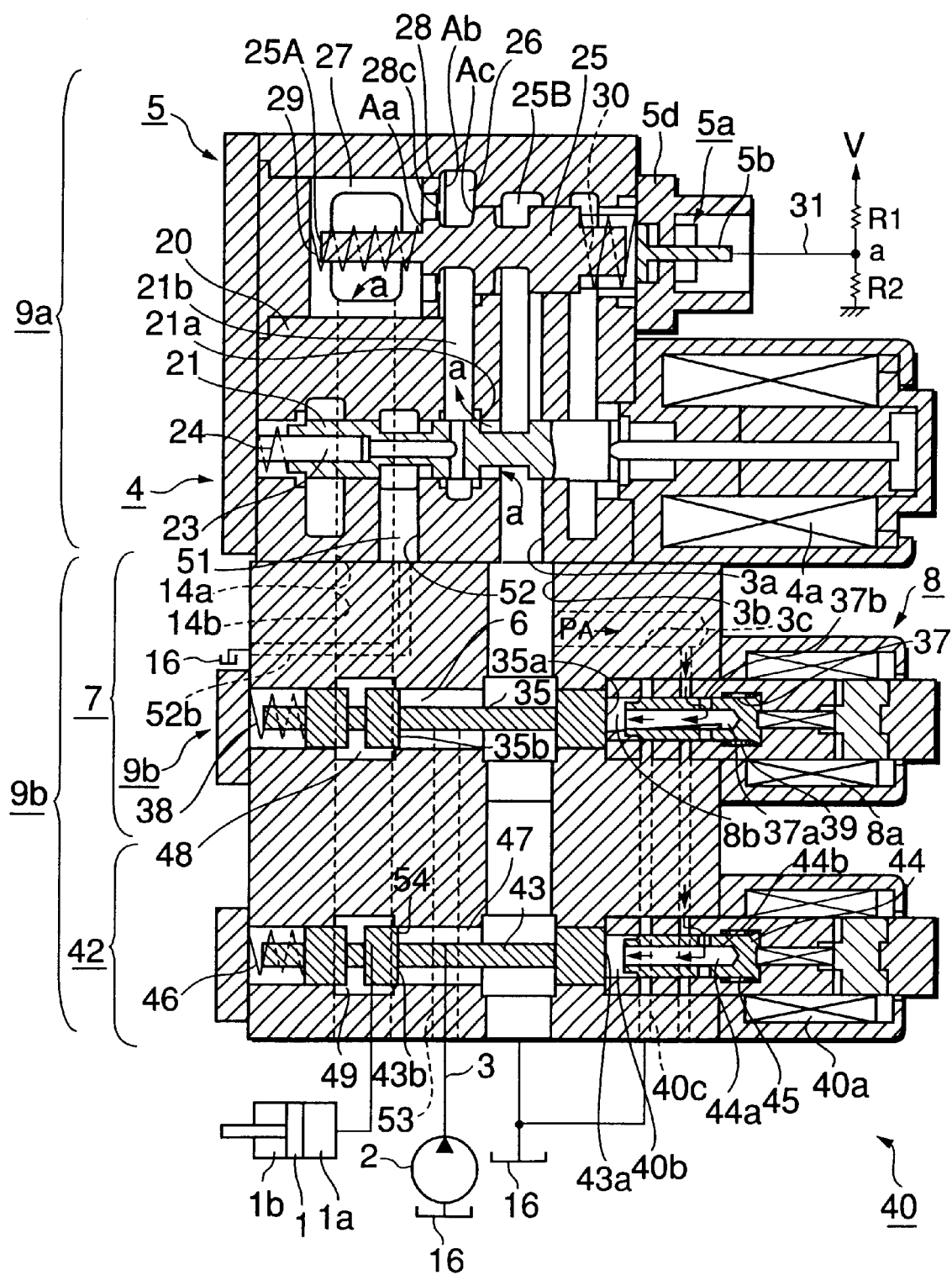
FIG. 9 is a cross sectional view which shows details of the clutch hydraulic pressure control valve of the second embodiment.

Next, a second embodiment will be described with reference to FIGS. 8 to 11. In the first embodiment, a description was given in with the bypass valve is mounted only to the supply side of the working oil to the clutch chamber so as to increase the supply flow amount of the oil to the clutch chamber. In the second embodiment, a description will be given in which the bypass valve is also mounted to the return side circuit when disengaging the clutch so as to open the return side bypass circuit at the same time of outputting the signal of the clutch disengagement and rain the oil from the clutch chamber, thereby reducing the drain time. FIGS. 8 and 9 are a circuit diagram of a clutch hydraulic control circuit and a cross sectional view of a clutch hydraulic control valve in accordance with the second embodiment, however, the same reference numerals are attached to the same elements as those described in FIGS. 1 and 2, and the description thereof will be omitted.

As shown in FIG. 8, a discharge bypass valve 42 and a discharge electromagnetic valve 40 are attached to the clutch fluid bypass valve block 9b in FIG. 1. The pressure oil from the hydraulic pump 2 is input to a port P1 of the discharge electromagnetic valve 40 via the discharge pipe passage 3, and a port P2 is communicated with a pressure receiving area portion at one end of the discharge bypass valve 42. Further, a port P3 is communicated with the tank 16. One port at a b position of the discharge bypass valve 42 is communicated with the clutch chamber 1a and another port is communicated with the tank 16. The command signal from the controller 10 is input to a discharge solenoid 40a of the discharge electromagnetic valve 40.

FIG. 9 shows a cross-sectional view of when the discharge electromagnetic valve 40 and the discharge bypass valve 42 are attached to the clutch fluid bypass valve block 9b shown in FIG. 1. The third oil chamber 27 of the flow amount detecting valve 5 is communicated with the clutch chamber 1a via the output port 14a, the clutch port 14b, an oil chamber 48, an oil chamber 49 and the clutch oil passage 14. Further, a tank port 52b is communicated with the tank 16, and the pressure oil from the hydraulic pump 2 is supplied to the pressure control valve 4 via the discharge pipe passage 3, an oil passage 53, the coil chamber 6, the hydraulic pump port 3b and the input port 3a. Further, the pressure oil from the pump 2 of the oil chamber 6 is supplied near the supply communication hold 37b of the supply free piston 37 and a discharge communication hole 44b of a discharge free piston 44 via the oil chamber 6 and the pilot oil passage 3c. Further, the oil chamber 47 is communicated with the tank 16, and the oil leaking within the clutch fluid bypass valve block 9b is communicated with the tank 16 via the drain port 40c.

The clutch fluid bypass valve block 9b has a spool 43 for a discharge bypass of the discharge bypass valve 42, and the discharge bypass spool 43 is structured such as to open (at a time of an open position) or shut (at a time of a close position) between the clutch chamber 1a and the tank 16.

A seventh spring 47 is provided so as to bee brought into contact with a left end in the drawing of the discharge bypass spool 43, and the seventh spring 46 serves as return spring for the discharge bypass spool 43. Further, the discharge free piston 44 which is interposed within the oil chamber 40b is provided in a right portion in the drawing of the discharge bypass spool 43, and the discharge free piston 44 is structured such as to move leftward when a command signal having a predetermined electric current valve is output to the discharge solenoid 40a. Further, a sixth spring 45 is provided on an outer peripheral surface of a right end portion of the discharge free piston 44, and the discharge free piston 44 is urged rightward by the sixth spring 45. The discharge free piston 44 has a discharge opening hole 44a which is open to a side of the discharge bypass spool 43 in an axial direction in an inner portion thereof, and has a discharge communication hole 44b which communicates the outer peripheral surface with the discharge opening hole 44a, at a predetermined position in an axial direction. The structure is made such that when the discharge free piston 44 moves leftward by the discharge solenoid 40a, the pilot oil passage 3c which is branched from the hydraulic pump oil passage 3 is communicated with the oil chamber 40b via the discharge communication hole 44b and the discharge opening hole 44a of the discharge free piston 44, so that the oil supplied from the pilot oil passage 3c and having a pilot pressure P is flowed as shown by an arrow so as to act on the discharge pressure receiving portion 43a of the discharge bypass spool 43, thereby pressing the discharge bypass spool 43 leftward. The structure is made such that the discharge opening portion 54 is opened and the clutch chamber 1a and the tank 16 are accordingly communicated with each other. Further, when the operating command of the discharge solenoid 40a is turned off, the discharge free piston 44 moves rightward due to the urging force of the sixth spring 45, the oil supplied from the pilot oil passage 3c and having the pilot pressure P is not flowed into the oil chamber 40b, and the oil chamber 40b is communicated with the drain port 40c, so that eh oil pressure within the oil chamber 40b becomes 0. Accordingly, because the discharge bypass spool 43 moves rightward due to the urging force of the seventh spring 46, the discharge opening portion 54 is closed and the communication between the clutch chamber 1a and the tank 16 is shut.

Next, an operation of the present embodiment will be described.

A hydraulic pressure is applied to the clutch 1 and the vehicle is set to a certain stage for shifting the speed. At this time, the supply electromagnetic valve 8 and the discharge electromagnetic valve 40 are in a state of not being energized, and the supply bypass spool 35 and the discharge bypass spool 43 hold positions illustrated in FIG. 9. Then, a predetermined electric current is input to the solenoid 4a from the controller 10, and the hydraulic pressures of the oil passage 21b, the oil chamber 27, the output port 14a, the clutch port 14b, the oil chamber 48, the oil chamber 49, the clutch oil passage 14 and the clutch chamber 1a are set to values which correspond to the electric current.

When changing the speed from the set stage for shifting the speed to the other stage for shifting the speed which does not require the engagement of the clutch 1, the clutch chamber 1a of the clutch 1 is discharged. At this time, at first, the command signal of the 0 value of the electric current is output to the solenoid 4a of the pressure control valve 4 from the controller 10. Then, the control valve spool 21 of the pressure control valve 4 is pressed rightward due to the urging force of the first spring 24 and the oil in the clutch chamber 1a is drained to the tank 16 via the third oil chamber 27, the oil passage 21b, the oil chamber 51 and the tank port 52b.

On the contrary, the command signal of the 0 value of the electric current is output to the solenoid 4a of the pressure control valve 4, and the energizing signal is output to the discharge solenoid 40a of the discharge electromagnetic valve 40 from the controller. When the discharge solenoid 40a is energized, the discharge free piston 44 is pressed leftward. Then, the pressure oil from the hydraulic pump 2 reaches the oil chamber 40b via the pilot oil passage 3c, the discharge communication hole 44b and the discharge opening hole 44a so as to press the discharge pressure receiving portion 43a of the discharge bypass spool 43 leftward against the urging force which is applied rightward the seventh spring 46. Accordingly, the oil chamber 49 and the oil chamber 47 are communicated with each other. Then, the oil within the clutch chamber 1a is drained to the tank 16 via the oil chamber 49 and the oil chamber 47.

An operation of the present embodiment will be further described with reference to FIGS. 10 and 11.

The operation at a time of supplying the oil to each of the clutch chambers 1a is the same as that of the embodiment mentioned above, and the description thereof will be omitted here.

Figure 10:
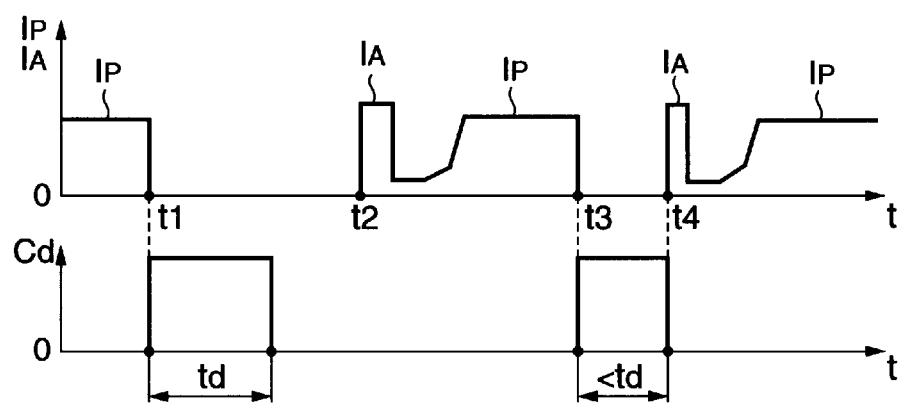
FIG. 10 is a schematic view of a relation between a trigger signal and a discharge signal.
Figure 11:
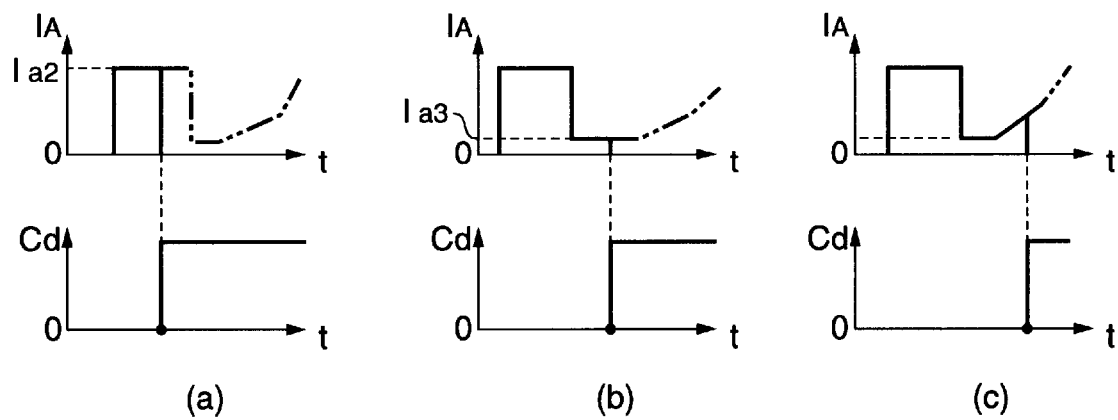
FIG. 11 is a schematic view of a relation between a trigger signal and a discharge signal when the trigger signal changes to 0 in a start process of the trigger signal.

Both in FIGS. 10 and 11, horizontal axes show a time t. Vertical axes of an upper stage in FIG. 10 show a hydraulic pressure command signal Ip and a trigger signal IA which the pressure control valve 4 outputs to the solenoid 4a, and vertical axes of each of upper stages in (a), (b) and (c) of FIG. 11 show the trigger signal IA. Further, vertical axes of a lower stage in FIG. 10 and of each of lower stages in (a), (b) and (c) of FIG. 11 show a discharge signal Cd which the discharge electromagnetic valve 40 outputs to the discharge solenoid 40a.

In FIG. 10, when setting the hydraulic pressure command signal Ip to the 0 value at the time t1 as described in the first embodiment, all the oil in the clutch chamber 1a of the clutch which has been engaged is drained so as to prepare for the next speed change. That is, at first, when setting the hydraulic pressure command signal Ip to the 0 value, the control valve spool 21 of the pressure control valve 4 is pressed rightward and a part of the oil in the clutch chamber 1a is drained to the tank 16 via the flow amount detecting valve 5 and the pressure control valve 4. At the same time of setting the hydraulic pressure command signal Ip to the 0 valve at the time t1, the discharge signal Cd of the predetermined electric current value is output to the discharge solenoid 40a of the discharge electromagnetic valve 40 from the controller. Then, because the discharge bypass spool 43 of the discharge bypass valve 42 is pressed leftward, most of the oil in the clutch chamber 1a is drained to the tank 16 via the oil chamber 49 and the oil chamber 47. The time td for continuing the discharge signal Cd is set to a desired time necessary for draining all of the oil in the clutch chamber 1a, for example, 3 seconds.

In the case that at the time t2, the trigger signal IA for engaging the clutch 1 stands up, the stage for shifting the speed is shifted to the other stage for shifting the speed which does not require the engagement of the clutch 1 after the clutch 1 is engaged and the stage for shifting the speed corresponding to the clutch 1 is set, the hydraulic pressure command signal Ip is set to the 0 value at the time t3, and the discharge signal Cd for draining most of the oil in the clutch chamber 1a of the clutch without passing through the flow amount detecting valve and the pressure control valve is stood up from the 0 value to the predetermined value. Further, when again standing up the trigger signal IA within the time which is shorted than the predetermined continuing time td after the time t3, for example, at the time t4 after 2 seconds, the continuing time of the discharge signal Cd of the clutch 1 does not reach the predetermined time td, however, the discharge signal Cd is immediately set to the 0 value.

Further, FIG. 11 shows an immediate rise of the discharge signal Cd to the predetermined value when setting the trigger signal IA or the hydraulic pressure command signal Ip to the 0 value at a time of the engaging step of the clutch 1. That is, in (a) of FIG. 11, when the trigger signal IA outputs the 0 value in the step of outputting the trigger signal Ia2 explained with respect to the first embodiment, the discharge signal Cd immediately rises to the predetermined valve. In (b) of FIG. 11, when the trigger signal IA outputs the 0 value in the step of outputting the trigger signal Ia3 explained with respect to the first embodiment, the discharge signal CD immediately rises to the predetermined value. Further, in (c) of FIG. 11, when the trigger signal IA outputs the 0 value in the step of gradually increasing the clutch hydraulic pressure during the time D shown in (D) of FIG. 5 explained with respect to the first embodiment, the discharge signal Cd immediately rises to the predetermined value.

Next, an effect of the present embodiment will be described.

The first embodiment corresponds to the structure obtained by adding on the clutch fluid bypass valve block 9b having the supply bypass valve 7 and the supply electromagnetic valve 8 to the clutch fluid supply valve block 9a having the pressure control valve 4 and the flow amount detecting valve 5. However, in the present embodiment, the structure is obtained by further adding on the discharge bypass valve 42 an the discharge electromagnetic valve 40 to the clutch fluid bypass valve block 9b in accordance with the first embodiment.

When shifting to the stage for shifting the speed which doe not require the engagement of a certain clutch 1 among a plurality of clutches, the oil in the clutch 1 which is full of the oil is discharged. At this time, the electric current command value which is applied to the solenoid 4a of the pressure control valve 4 keeping a predetermined electric current value from the controller 10 becomes the 0 value. then, the position of the control valve spool 21 of the pressure control valve 4 is switched, and a small amount of the oil among the oil in the clutch chamber 1 a is drained to the tank 16 via the flow amount detecting valve 5 and the pressure control valve 4. On the contrary, when the electric current 0 valve is output from the controller 10 to the solenoid 4a of the pressure control valve 4, the discharge signal Cd having a predetermined electric current valve is output to the discharge solenoid 40a of the discharge electromagnetic valve 40 form the controller 10. then, the position of the discharge bypass spool 43 of the discharge bypass valve 42 is switched so as to communicate the clutch chamber 1a with the tank 16, and most of the oil in the clutch chamber 1a is directly drained to the tank 16 without passing through the flow amount detecting valve 5 and the pressure control valve 4.

As mentioned above, a small amount of the oil in the clutch chamber 1a is drained via the flow amount detecting valve 5 and the pressure control valve 4, and most of the remaining oil is directly drained to the tank 16 while bypassing the flow amount detecting valve 5 and the pressure control valve 4. Then, in comparison with the case that the discharge bypass valve 42 an the discharge electromagnetic valve 40 are not added on, it is possible to reduce the time for discharging the oil in the clutch chamber 1.

Accordingly, even in the vehicle which has the clutch of the large capacity piston volume and in which the clutch is frequently engaged and disengaged, it is possible to drain all of the oil in the clutch chamber 1a within the time after the clutch is disengaged and before the engagement is started, and the state of preparing for always supplying the same amount of oil is maintained at a time of starting the engagement, so that a uniform clutch engaging time can be obtained. Further, because of the addition of the clutch fluid bypass valve block 9b having the discharge bypass valve 42 and the discharge electromagnetic valve 40 to the clutch fluid supply valve block 9a having the pressure control valve 4 and the flow amount detecting valve 5, a large space is required and the expensive and large-size pressure control valve 4 and flow amount detecting valve 5 are not required, so that it is possible to obtain an inexpensive clutch pressure control apparatus of the transmission even in the case of the clutch having the large capacity piston volume.

In this case, the bypass function is given to the supply and discharge of the oil in the clutch chamber 1a respectively by the supply bypass valve 7 and the supply electromagnetic valve 8, and the discharge bypass valve 42 and the discharge electromagnetic valve 40, however, the structure is not limited to this, and the electromagnetic valve also having a bypass flow passage may be provided and the function of the supply bypass or the discharge bypass may be given by directly inputting the command to the solenoid of the electromagnetic valve.

Further, the means for detecting the filling state of the clutch chamber 1a in the present invention is not limited to the flow amount detecting valve 5, and the sensor 5a which is operated due to the differential pressure between the upstream and the downstream of the flow amount detecting valve 5 so as to detect the filling state. That is, for example, the structure may be made such that a flow amount detecting valve (not shown) (which may be a variable throttle) is provided between the pressure control valve 4 and the clutch 1, a hydraulic pressure sensor (not shown) detects a hydraulic pressure in an upstream side and a downstream side of the flow amount detecting valve, the controller 10 inputs the detected hydraulic pressure in the upstream side and the downstream side and a passing flow amount of the working oil is converted on the basis of the difference of the hydraulic pressures so as to detect the filling state of the clutch chamber 1a.

Further, in the present invention, there is are shown embodiments having the structure in which the first oil chamber 25B and the second oil chamber 26 are not communicated with each other when the detecting valve spool 25 of the flow amount detecting valve 5 is operated, however, the present invention is not limited to this, and can be applied to the structure in which the first oil chamber 25B and the second oil chamber 26 are communicated with each other.

Further, in the present invention, the completion of the filling in the clutch chamber 1a is detected by sensor 5a, however, the completion of the filling in the clutch chamber 1a may be judged on the basis of the hydraulic pressure of the clutch chamber 1a which is detected by the pressure sensor (not shown).

Further the structure is such that the relation among the trigger time, the engine speed and the oil temperature which are used at a time of setting the trigger time is stored by the function map shown in FIGS. 3 and 4, however, the structure is not limited to this, it may be stored as a predetermined function. In this case, an intermediate value of the respective functions may be determined by calculating, for example, in accordance with an interpolation.

Further, in the steps 1 and 2 in FIG. 6, the controller 10 may be structured such as to automatically read the target filling time and the trigger time in correspondence to the current position of the stage for shifting the speed, the engine speed and the oil temperature of the transmission at every predetermined periodical time of a level which can detect the speed change operation of the operator, without relation to the operation of the operator, and control and renew the trigger time on the basis thereof.

As mentioned above, in accordance with the present invention, the clutch fluid bypass valve block having the supply bypass valve and the supply electromagnetic valve is added on to the clutch fluid supply valve block having the pressure control valve and the flow amount detecting valve. When the clutch chamber is full of the oil at a time of changing the speed, the oil is supplied from the hydraulic pump to the clutch chamber not only via the pressure control valve and the flow amount detecting valve, but also via the supply bypass circuit which is communicated from the hydraulic pump to the clutch chamber by operating the supply electromagnetic valve and opening the supply bypass valve. Accordingly, in comparison with the case of having no supply bypass valve and no supply electromagnetic valve, it is possible to reduce the filling time of the oil in the clutch chamber and it is possible to reduce the speed change time lag.

When supplying the oil to the clutch chamber at a time of the speed change, in the case of setting the opening degree of the pressure control valve to a large degree when starting the speed change and to a small degree after a predetermined time has passed after the speed change is started, the supply bypass valve is opened for a predetermined time at a time of starting the speed change. At this time, on the basis of the filling completion time which is detected at every speed change, the continuing time for which the opening degree of the pressure control valve is large is corrected while being target value. Further, in the case of always setting the opening degree of the pressure control valve to a predetermined constant flow amount between the start time of the speed change and the completion of the filling, the continuing time for which th supply bypass valve opens from the time of starting the speed change is corrected while being learned so that the filling completion time comes near the target value. Accordingly, even in the case that the oil temperature or the leaking amount of the clutch chamber changes, the case that the piston volume has a dispersion and fixed filling time can always be obtained, so that it is possible to obtain an excellent speed change operability.

In order to rapidly discharge the oil in the clutch chamber at a time of disengaging the clutch, the clutch fluid bypass valve block having the discharge bypass valve and the liquid supply valve block having the pressure control valve and the flow amount detecting valve. When the engagement of the clutch is not required, the oil in the clutch chamber is drained to the tank not only via the pressure control valve and the low amount detecting valve but also via the discharge bypass circuit which is communicated from the clutch chamber to the tank by operating the discharge electromagnetic valve and opening the discharge bypass valve. accordingly, in comparison with the case that the discharge bypass valve and the discharge electromagnetic valve are not provided, it is possible to reduce the discharging time of the oil in the clutch chamber. Therefore, even in the vehicle which has the clutch of the large capacity piston volume and in which the clutch is frequently engaged and disengaged, it is possible to drain all of the oil in the clutch chamber within the time after the clutch is disengaged and before the engagement of the other clutch is started, and because the state of preparing to always supply the same amount of oil is maintained when starting the engagement, kit is possible to obtain a uniform time for engaging the clutch.

Further, the positions of the clutch pressure controlling ports such as the input port for supplying the pressure oil from the hydraulic pump, the output port communicated with the clutch chamber, the drain port communicated with the tank and the like which are arranged in the clutch fluid supply valve block having the pressure control valve and the flow amount detecting valve, and in the clutch fluid bypass valve block having the supply bypass valve and the discharge bypass valve, are arranged at the positions which are aligned when integrally assembling these two blocks. Accordingly, because it is possible to easily add on the clutch fluid bypass valve block to the clutch fluid supply valve bock, no great space is required and no expansive and large capacity of pressure control valve and flow amount detecting valve are required. Then, it is possible to obtain an inexpensive clutch pressure control apparatus of the transmission.

What is claimed is:

1. A clutch pressure control apparatus of a transmission having a pressure control valve which supplies a discharge oil in a hydraulic pump to a clutch chamber at a time of engaging a clutch, whereby the clutch chamber is filled with the discharge oil, gradually increases a hydraulic pressure in the clutch chamber after it is filled so as to engage the clutch, and drains the oil in the clutch chamber to a tank at a time of disengaging the clutch, wherein said apparatus comprises:

a supply bypass valve which directly supplies the discharge oil of the hydraulic pump to the clutch chamber by bypassing the pressure control valve at a time of engaging the clutch; and a discharge bypass valve which directly drains the oil in the clutch chamber to the tank by bypassing the pressure control valve at a time of disengaging the clutch.

2. A clutch pressure control apparatus of a transmission, comprising:

a flow amount detecting valve which detects that a clutch chamber is full of an oil;

a pressure control valve which supplies an oil to the clutch chamber at a time of engaging the clutch, whereby the clutch chamber is full of the discharge oil, gradually increases a hydraulic pressure in the clutch chamber after the flow amount detecting valve detects that the clutch chamber is full of the oil so as to engage the clutch, and drains the oil in the clutch chamber to a tank at a time of disengaging the clutch; and a supply bypass valve which directly supplies the oil to the clutch chamber from the hydraulic pump by bypassing the pressure control valve at a time of engaging the clutch.

3. A clutch pressure control apparatus of a transmission, comprising:

a flow amount detecting valve which detects that a clutch chamber is full of an oil;

a pressure control valve which supplies an oil to the clutch chamber at a time of engaging a clutch, whereby the clutch chamber is filled with the discharge oil, gradually increases a hydraulic pressure in the clutch chamber after the flow amount detecting valve detects that the clutch chamber is filled with the oil so as to engage the clutch, and drains the oil in the clutch chamber to a tank at a time of disengaging the clutch;

a supply bypass valve which directly supplies the oil to the clutch chamber from the hydraulic pump by bypassing the pressure control valve at a time of engaging the clutch; and a discharge bypass valve which directly drains the oil in the clutch chamber to the tank by bypassing the pressure control valve at a time of disengaging the clutch.

4. A clutch pressure control apparatus of a transmission as claimed in claim 2, wherein a clutch fluid supply valve block provided with clutch pressure controlling ports comprising an input port within which the pressure control valve and the flow amount detecting valve are arranged and which supplies the pressure oil discharged from the hydraulic pump to the pressure control valve and the flow amount detecting valve, an output port which outputs the oil output from the flow amount detecting valve to the clutch chamber, a drain port which drains the oil in the clutch chamber to the tank, and a clutch fluid bypass valve block within which the supply bypass valve is arranged and in which said clutch pressure controlling ports are provided, are respectively provided as independent elements, and the clutch pressure controlling ports in the respective blocks are provided at a position where the clutch fluid supply valve block and the clutch fluid bypass valve block are aligned with each other when they are assembled and connected with each other.

5. A clutch pressure control apparatus of a transmission as claimed in claim 3, wherein a clutch fluid supply valve block provided with clutch pressure controlling ports comprising an input port within which the pressure control valve and the flow amount detecting valve are arranged and which supplies the pressure oil discharged from the hydraulic pump to the pressure control valve and the flow amount detecting valve, an output port which outputs the oil output from the flow amount detecting valve to the clutch chamber, a drain port which drains the oil in the clutch chamber to the tank, and a clutch fluid bypass valve block within which the supply bypass valve and the discharge bypass valve are arranged and in which said clutch pressure controlling ports are provided, are respectively provided as independent elements, and the clutch pressure controlling ports in the respective blocks are provided at a position where the clutch fluid supply valve block and the clutch fluid bypass valve block are aligned with each other when they are assembled and connected with each other.

6. A clutch pressure control apparatus of a transmission as claimed in either claim 1 or claim 2, wherein the supply bypass valve has a pressure receiving chamber which receives a hydraulic pressure from the hydraulic pump, and the hydraulic pressure in said pressure receiving chamber is switched by an electromagnetic valve which is provided with a switching valve for switching between a position at which the oil from the hydraulic pressure pump is introduced into said pressure receiving chamber and a position at which the oil in said pressure receiving chamber is drained due to a spring force, thereby opening and closing the supply bypass circuit.

7. A clutch pressure control apparatus of a transmission as claimed in claim 1, wherein the discharge bypass valve has a pressure receiving chamber which receives a hydraulic pressure from the hydraulic pump, and the hydraulic pressure in said pressure receiving chamber is switched by an electromagnetic valve which is provided with a switching valve for switching between a position at which the oil from the hydraulic pressure pump is introduced into said pressure receiving chamber and a position at which the oil in said pressure receiving chamber is drained due to a spring force, thereby opening and closing the discharge bypass circuit.

8. A clutch pressure control apparatus of a transmission as claimed in either claim 1 or claim 2, further comprising a controller which outputs a command signal for opening the supply bypass valve for a first predetermined time from the time of instructing a start of the clutch engagement to the supply bypass valve and a command signal for opening the pressure control valve for a second predetermined time from a time of instructing a start of the clutch engagement to the pressure control valve, respectively, said controller controlling so that the first predetermined time is shorter than the second predetermined time.

9. A clutch pressure control apparatus of a transmission as claimed in claim 1, further comprising a controller which outputs a command signal for directly discharging the oil in the clutch chamber to the tank to the discharge bypass valve for a predetermined time at a time of disengaging the clutch.

10. A method of controlling a clutch pressure of a transmission structured such as to supply an oil to a clutch chamber via a pressure control valve and directly supply the oil to the clutch chamber from a hydraulic pump by bypassing the pressure control valve by a supply bypass valve, at a time of engaging a clutch, comprising the steps of:

opening both of the pressure control valve and the supply bypass valve at a time of engaging the clutch;

closing only the supply bypass valve after a first predetermined time has passed from a time of instructing a start of an engagement;

making an opening degree of the pressure control valve smaller than an opening degree at a time of instructing the start of the engagement after a second predetermined time which is greater than the first predetermined time has passed from the time of instructing the start of the engagement; and thereafter, supplying the oil to the clutch chamber till the clutch chamber is full of the oil.

11. A method of controlling a clutch pressure of a transmission structured such as to supply an oil to a clutch chamber iva a pressure control valve and directly supply the oil to the clutch chamber from a hydraulic pump by bypassing the pressure control valve by a supply bypass valve, at a time of engaging a clutch, comprising the steps of:

opening both of the pressure control valve and the supply bypass valve at a time of engaging the clutch;

closing only the supply bypass valve after a first predetermined time has passed from a time of instructing a start of an engagement; and thereafter, supplying the oil to the clutch chamber only by the pressure control valve till the clutch chamber is full of the oil.

12. A method of controlling a clutch pressure of a transmission as claimed in claim 10, further comprising:

calculating a target filling time before the clutch chamber is full of the oil and an opening time from a time of instructing the start of the engagement of the pressure control valve in accordance with the target filling time, on the basis of an engine speed and an oil temperature;

comparing an actual filling time at a time of operating the engagement of said clutch in accordance with the calculated opening time with said calculated target filling time;

correcting the opening time to a time a predetermined time shorter than said calculated time when the actual filling time is shorter than the target filling time, and correcting the opening time to a time a predetermined time longer than said calculated time when the actual filing time is longer than the target filling time, thereby storing the opening time in correspondence to the conditions of the same engine speed and oil temperature; and controlling an opening of the pressure control valve under the same condition thereafter on the basis of the stored opening time so that the actual filling time is within the target filling time.

13. A method of controlling a clutch pressure of a transmission as claimed in claim 11, further comprising:

calculating a target filling time before the clutch chamber is full of the oil and an opening time from a time of instructing the start of the engagement of the supply bypass valve in accordance with the target filling time, on the basis of an engine speed and an oil temperature;

comparing an actual filling time at a time of operating the engagement of said clutch in accordance with the calculated opening time with said calculated filling target time;

correcting the opening time to a time a predetermined time shorter than said calculated time when the actual filling time is shorter than the target filling time, and correcting the opening time to a time a predetermined time longer than said calculated time when the actual filling time is longer than the target filling time, thereby storing the opening time in correspondence to the conditions of the same engine speed and oil temperature; and controlling an opening of the supply bypass valve under the same condition thereafter on the basis of the stored opening time so that the actual filling time is within the target filling time.

* * * * *